US011258303B2

(12) United States Patent
Jung et al.

(10) Patent No.: US 11,258,303 B2
(45) Date of Patent: Feb. 22, 2022

(54) ELECTRONIC DEVICE AND METHOD FOR WIRED AND WIRELESS CHARGING IN ELECTRONIC DEVICE

(71) Applicant: Samsung Electronics Co., Ltd., Suwon-si (KR)

(72) Inventors: Ku-Chul Jung, Seoul (KR); Chul-Woo Park, Suwon-si (KR); Sung-Geun Yoon, Hwaseong-si (KR); Sang-Hyun Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 16/265,344

(22) Filed: Feb. 1, 2019

(65) Prior Publication Data

US 2019/0165613 A1 May 30, 2019

Related U.S. Application Data

(63) Continuation of application No. 15/240,516, filed on Aug. 18, 2016, now Pat. No. 10,199,872.

(30) Foreign Application Priority Data

Aug. 19, 2015 (KR) .................. 10-2015-0116705

(51) Int. Cl.
*H02J 50/12* (2016.01)
*H04B 5/00* (2006.01)
(Continued)

(52) U.S. Cl.
CPC ............. *H02J 50/12* (2016.02); *H02J 7/025* (2013.01); *H02J 7/027* (2013.01); *H02J 7/045* (2013.01);
(Continued)

(58) Field of Classification Search
CPC .. H02J 50/12; H02J 50/80; H02J 50/10; H02J 7/025; H02J 7/027; H02J 7/045; H04B 5/0037
(Continued)

(56) References Cited

U.S. PATENT DOCUMENTS 9,716,401 B2   7/2017   Wojik
2010/0194335 A1   8/2010   Kirby et al.
(Continued)

FOREIGN PATENT DOCUMENTS

CN   101882814 A   11/2010
CN   203522250 U   4/2014
(Continued)

OTHER PUBLICATIONS

Chinese Office action dated Nov. 3, 2020, issued in Chinese Application No. 201610694833.1.
(Continued)

*Primary Examiner* — Hal Kaplan
*Assistant Examiner* — Swarna N Chowdhuri
(74) *Attorney, Agent, or Firm* — Jefferson IP Law, LLP

(57) ABSTRACT

An apparatus for wired and wireless charging of an electronic device are provided. The electronic device includes a housing, a display on a surface of the housing, a battery mounted in the housing, a circuit electrically connected with the battery, a conductive pattern positioned in the housing, electrically connected with the circuit, and configured to wirelessly transmit power to an external device, a connector on another surface of the housing and electrically connected with the circuit, a memory, and a processor electrically connected with the display, the battery, the circuit, the connector, and/or the memory. The circuit is configured to electrically connect the battery with the conductive pattern to wirelessly transmit power to the external device and
(Continued)

electrically connect the battery with the connector to transmit power to the external device by wire, simultaneously or selectively, with wirelessly transmitting power to the external device.

14 Claims, 30 Drawing Sheets

(51) Int. Cl.
    *H02J 50/10*     (2016.01)
    *H02J 50/80*     (2016.01)
    *H02J 7/02*     (2016.01)
    *H02J 7/04*     (2006.01)

(52) U.S. Cl.
    CPC .............. *H02J 50/10* (2016.02); *H02J 50/80* (2016.02); *H04B 5/0037* (2013.01)

(58) Field of Classification Search
    USPC .......................................................... 307/104
    See application file for complete search history.

(56) References Cited

U.S. PATENT DOCUMENTS

| | | |
|---|---|---|
| 2011/0221390 A1 | 9/2011 | Won et al. |
| 2013/0147429 A1 | 6/2013 | Kirby et al. |
| 2013/0278207 A1 | 10/2013 | Yoo |
| 2013/0334883 A1* | 12/2013 | Kim ........................ H02J 50/40 307/29 |
| 2014/0009120 A1* | 1/2014 | Kim ........................ H02J 7/02 320/138 |
| 2014/0015478 A1 | 1/2014 | Von Novak |
| 2014/0015487 A1 | 1/2014 | Brown et al. |
| 2014/0091623 A1 | 4/2014 | Shippy et al. |
| 2014/0191033 A1* | 7/2014 | Wojcik ............... G06K 7/10009 235/449 |
| 2014/0210405 A1 | 7/2014 | Yang |
| 2014/0308995 A1* | 10/2014 | Wu ........................ H02J 5/005 455/573 |
| 2015/0061403 A1 | 3/2015 | Jeong et al. |
| 2015/0102680 A1 | 4/2015 | Menegoli |
| 2015/0194839 A1* | 7/2015 | Wojcik ............... H01M 10/425 320/108 |
| 2017/0018949 A1 | 1/2017 | Pudipeddi et al. |
| 2017/0338684 A1 | 11/2017 | Mishriki et al. |

FOREIGN PATENT DOCUMENTS

| | | |
|---|---|---|
| CN | 204089246 U | 1/2015 |
| CN | 104426248 A | 3/2015 |
| CN | 104617620 A | 5/2015 |
| JP | 2005-151609 A | 6/2005 |
| JP | 2013-523070 A | 6/2013 |
| KR | 10-2012-0105163 A | 9/2012 |
| KR | 10-2013-0142312 A | 12/2013 |
| KR | 10-1404013 B1 | 6/2014 |
| KR | 10-2014-0113892 A | 9/2014 |
| KR | 10-2015-0038347 A | 4/2015 |

OTHER PUBLICATIONS

Korean Office Action dated Jan. 6, 2020, issued in a counterpart Korean application No. 10-2015-0116705.
European Office Action dated Feb. 12, 2019; Application # 16 184 877.5-1220; Ref. DK/P236602EP.
Chinese Office Action dated Sep. 2, 2021, issued in Chinese Patent Application No. 201610694833.1.
Korean Office Action dated Nov. 24, 2021, issued in Korean Patent Application No. 10-2020-0158686.

* cited by examiner

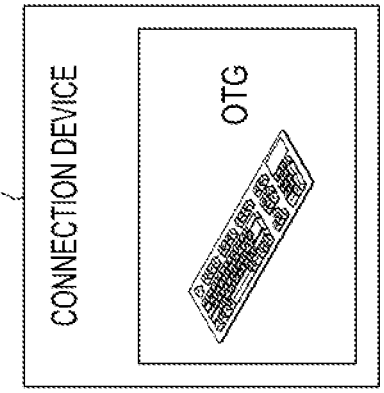
FIG.21E
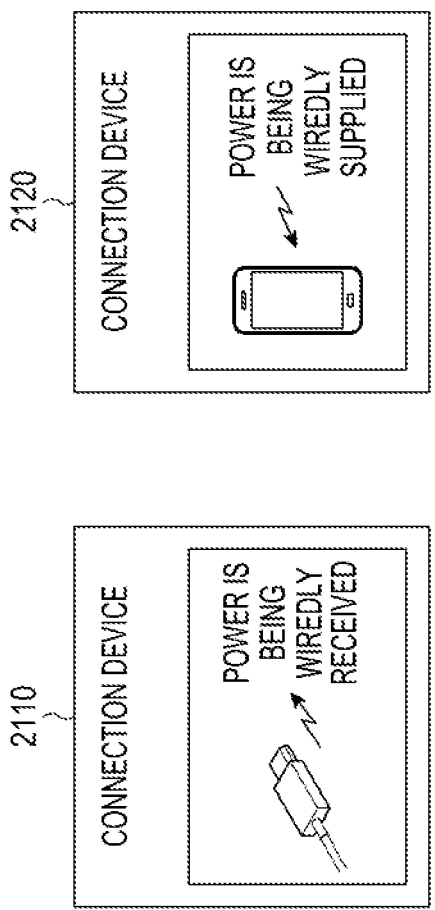
FIG.21A
FIG.21B
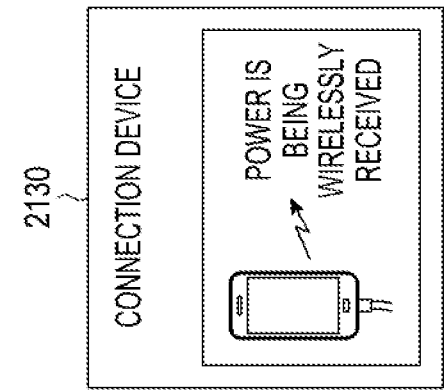
FIG.21C
FIG.21D

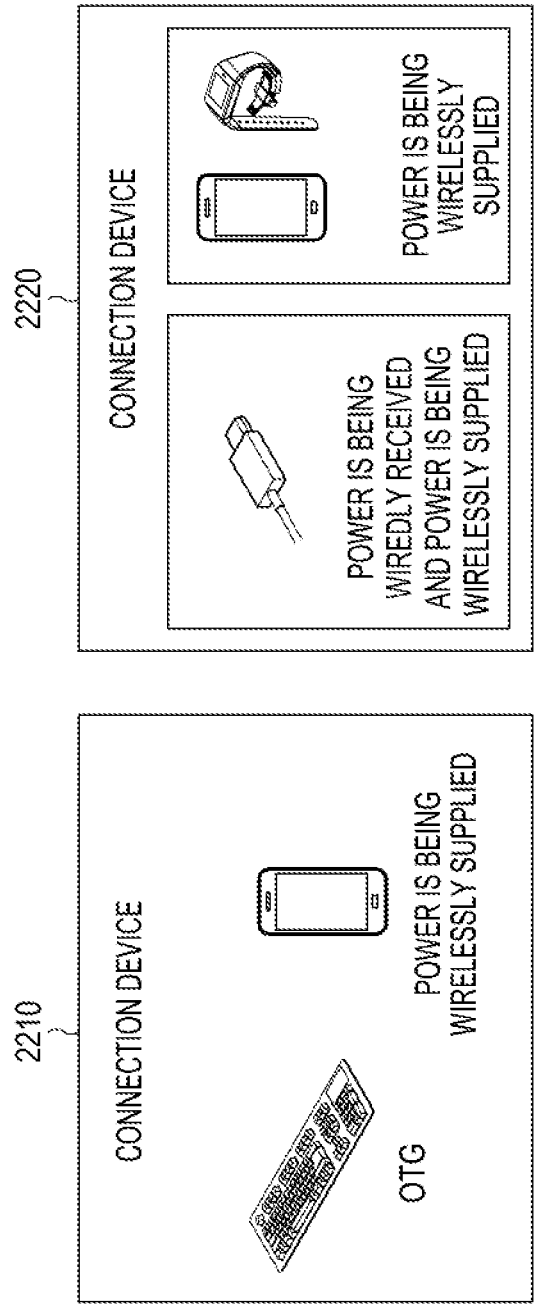

ELECTRONIC DEVICE AND METHOD FOR WIRED AND WIRELESS CHARGING IN ELECTRONIC DEVICE

CROSS-REFERENCE TO RELATED APPLICATION(S)

This application is a continuation application of prior application Ser. No. 15/240,516, filed on Aug. 18, 2016, which has issued as U.S. Pat. No. 10,199,872 on Feb. 5, 2019 and was based on and claimed priority under 35 U.S.C § 119(a) of a Korean patent application number 10-2015-0116705, filed on Aug. 19, 2015, in the Korean Intellectual Property Office, the disclosure of which is incorporated by reference herein in its entirety.

TECHNICAL FIELD

The present disclosure relates to an electronic device. More particularly, the present disclosure relates to an electronic device and a method for wire and wireless charging of the electronic device.

BACKGROUND

In recent years, advancements in technology, e.g. information and communication technology, and semiconductor technology, have enabled various electronic devices to be widely used and rapidly disseminated. Some of the more recently developed electronic devices also provide mobile communication.

As various portable electronic devices are used, batteries and battery charging methods affecting performance and usage time of the portable electronic devices have drawn interest. Accordingly, electronic devices equipped with wireless charging means, as well as wired charging means, have been provided, and attention has also been directed to an electronic device that provides both wired and wireless charging.

An electronic device, recently provided, typically includes a charging circuit, and the electronic device is connected to a wired charging device, and a power supply path from the wired charging device is connected to the charging circuit of the electronic device to charge a battery of the electronic device. When the electronic device is connected with a wireless charging device, a power supply path from the wireless charging device is connected to the charging circuit of the electronic device, thereby charging the battery of the electronic device.

Upon performing an on-the-go (OTG) function between electronic devices, an electronic device operating as a server may supply power to another electronic device working as a client for an operation of the client device. An electronic device may supply power to an external electronic device, for example, when a memory is connected to an external connector of the electronic device to move data, or when a keyboard is connected, such that the electronic device performs a function of receiving a data input therefrom. However, the electronic device supplies power to the client electronic device using a path including a charging circuit, which is a reverse path of the path where the electronic device charges its battery, to enable the client electronic device to perform an OTG function. Thus, it is not yet possible to charge a battery or to supply power to an external device through the battery while performing the OTG function. For example, when a USB memory is connected to an OTG connection unit, the electronic device supplies power to the USB memory through the OTG connection unit to bring data, and thus it is limited to receive external power through the OTG connection unit. Similarly, when a keyboard is connected to an OTG connection unit, the electronic device supplies power to the keyboard through the OTG connection unit to receive a data input therefrom, thereby making it unavailable to receive external power through the OTG connection unit.

A charging circuit of an electronic device of the related art can be configured to receive a charging current from a wired charging device or a wireless charging device to charge a battery, but the electronic device is not able to provide power of the battery to the wired or wireless charging device.

Accordingly, various embodiments of the present disclosure provide an electronic device and a method for wired and wireless charging of the electronic device, in which the electronic device may receive power from an external, wired or wireless, charging device to charge a battery and provide power of the battery to an external wired or wireless charging device.

Further, various embodiments of the present disclosure provide an electronic device and a method for wired and wireless charging of the electronic device, in which the electronic device may provide power of the battery to an external wireless device while performing an OTG function.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described. Accordingly, an aspect of the present disclosure is to provide an electronic device and a method for wiredly and wirelessly charging of the electronic device.

In accordance with an aspect of the present disclosure, an electronic device is provided. The electronic device includes a housing, a display on a surface of the housing, a battery mounted in the housing, a circuit electrically connected with the battery, a conductive pattern positioned in the housing, the conductive pattern electrically connected with the circuit and configured to wirelessly transmit power to an outside of the electronic device (e.g., to an external device such as a portable electronic device), a connector on another surface of the housing and electrically connected with the circuit, a memory, and a processor electrically connected with the display, the battery, the circuit, the connector, or the memory. The circuit may be configured to electrically connect the battery with the conductive pattern to wirelessly transmit power to the external device (such as a portable electronic device) and electrically connect the battery with the connector to wiredly transmit power to the external device simultaneously or selectively with the wirelessly transmitting of power to the external device.

In accordance with another aspect of the present disclosure, an electronic device is provided. The electronic device includes a housing, a power interface connectable with an external power source, a circuit electrically connected with the power interface, a conductive pattern positioned in the housing, the conductive pattern electrically connected with the circuit and configured to wirelessly transmit power to an outside of the electronic device, and a connector on a surface of the housing and electrically connected with the circuit.

The circuit may be configured to electrically connect the power interface with the conductive pattern to wirelessly transmit the power to the external device and electrically connect the power interface with the connector to wiredly transmit the power to the external device simultaneously or selectively with wirelessly transmitting the power to the external device.

In accordance with another aspect of the present disclosure, an electronic device is provided. The electronic device includes a housing, a battery mounted in the housing, a circuit electrically connected with the battery, a conductive pattern positioned in the housing, the conductive pattern electrically connected with the circuit, and configured to wirelessly transmit power to an outside of the electronic device, and a connector on a surface of the housing, and the conductive pattern electrically connected with the circuit. The circuit is configured to electrically connect the battery with the conductive pattern to wirelessly transmit the power to the external device and electrically connect the battery with the connector to wiredly transmit the power to the external device, simultaneously or selectively with wirelessly transmitting of the power to the external device.

In accordance with another aspect of the present disclosure, an electronic device is provided. The electronic device includes a housing, a battery mounted in the housing, a circuit electrically connected with the battery, a first conductive pattern and a second conductive pattern positioned in the housing, the first and second conductive patterns electrically connected with the circuit and configured to wirelessly transmit power to an outside of the electronic device or receive the power from an external source, and a connector on a surface of the housing and electrically connected with the circuit. The circuit may be configured to wirelessly receive first power from the external source through the second conductive pattern or wiredly receive the first power from the external source through the connector, change a first voltage generated by the battery into a second voltage higher than the first voltage, transmit a portion of a current generated by the second voltage to the first conductive pattern, and transmit another portion of the current generated by the second voltage to the connector.

In accordance with another aspect of the present disclosure, a method of operating an electronic device is provided. The method includes determining whether the electronic device is connected with a wireless power receiving device and a wired power receiving device, when the wireless power receiving device and the wired power receiving device are connected, electrically connecting a battery with a conductive pattern to wirelessly transmit power to the wirelessly power receiving device, by the electronic device, and while simultaneously transmitting wirelessly power to an external device, electrically connecting the battery with a connector to wiredly transmit power to the wired power receiving device, by the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 21A, 21B, 21C, 21D, 21E, 22A, 22B, and 23 are views illustrating a screen displayed on an electronic device according to various embodiments of the present disclosure.

Throughout the drawings, like reference numerals will be understood to refer to like parts, components, and structures.

DETAIL DESCRIPTION

Figure 1:
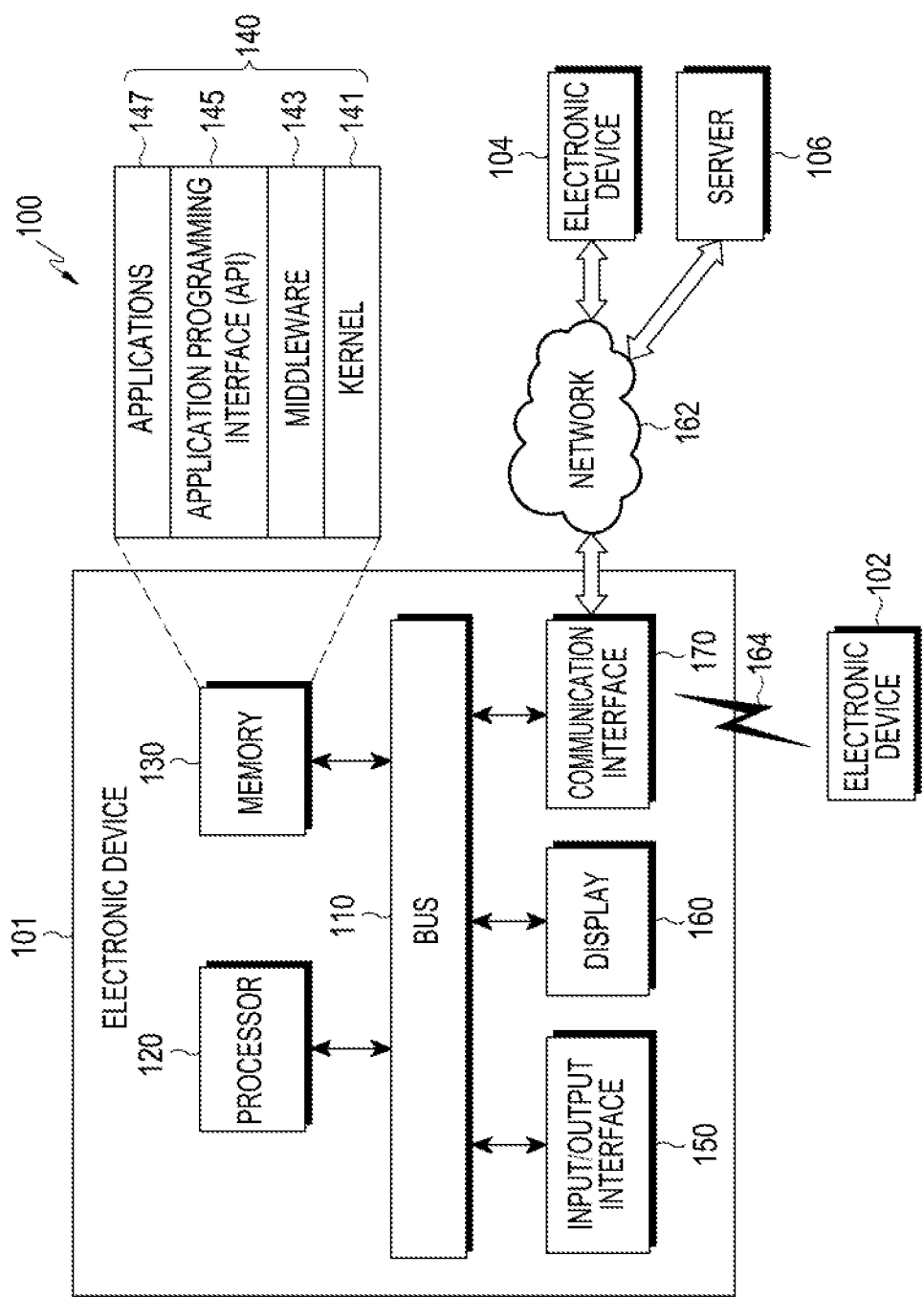
FIG. 1 is a view illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude various embodiments of the present disclosure.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating a network environment including an electronic device according to an embodiment of the present disclosure.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of Wi-Fi, Bluetooth (BT), near-field communication (NFC), or GNSS. The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
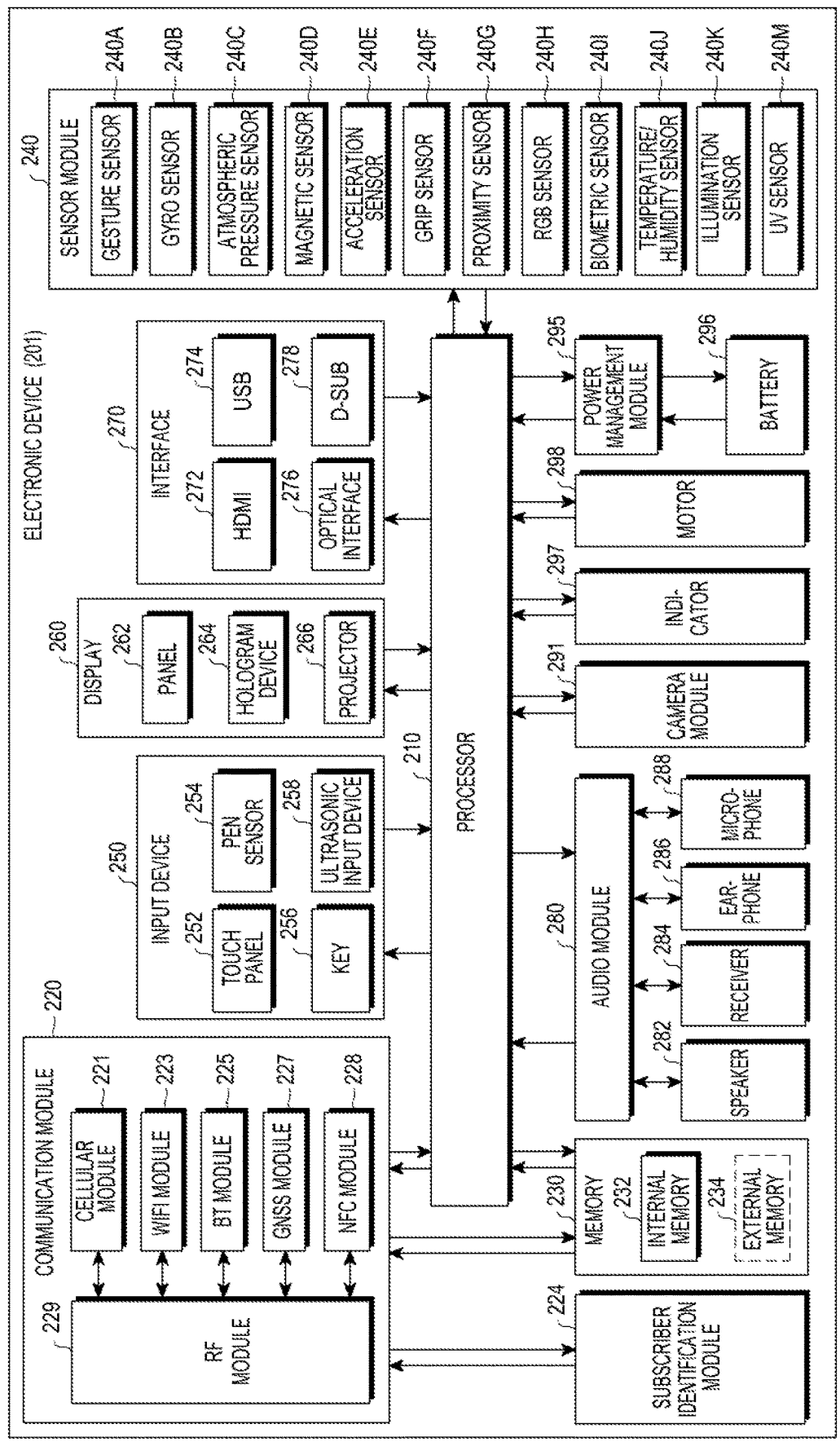
FIG. 2 is a block diagram illustrating an electronic device according to an embodiment of the present disclosure.

FIG. 2 is a block diagram illustrating an electronic device 201 according to an embodiment of the present disclosure. The electronic device 201 may include the whole or part of the configuration of, e.g., the electronic device 101 shown in FIG. 1.

Referring to FIG. 2, the electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphics processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a Wi-Fi module 223, a BT module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP.

The Wi-Fi module 223, the BT module 225, the GNSS module 227, or the NFC module 228 may include a process for, e.g., processing data communicated through the module. According to an embodiment of the present disclosure, at least some (e.g., two or more) of the cellular module 221, the Wi-Fi module 223, the BT module 225, the GNSS module 227, or the NFC module 228 may be included in a single integrated circuit (IC) or an IC package. According to an embodiment of the present disclosure, the Wi-Fi module 223, the BT module 225, the GNSS module 227, or the NFC module 228 each may connect the electronic device 101 with other devices (e.g., electronic devices 102 and 104 or server 106) through communication.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the BT module 225, the GNSS module 227, or the NFC module 228 may communicate RF signals through a separate RF module.

The subscription identification module 224 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a mini-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color (RGB) sensor 240H (e.g., a red-green-blue (RGB) sensor, a biometric sensor 240I, a temperature/humidity sensor 240J, an illumination sensor 240K, or an ultraviolet (UV) sensor 240M. Additionally, or alternatively, the sensing module 240 may include additional elements (not shown), e.g., an electronic nose (E-nose) sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a pen sensor (digital pen) 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a HDMI 272, an USB 274, an optical interface 276, or a D-subminiature (D-sub) 278. The interface 270 may be included in e.g., the communication interface 170 shown in FIG. 1. Additionally, or alternatively, the interface 270 may include a mobile high-definition link (MHL) interface, an SD card/MMC interface, or infrared data association (IrDA) standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an image signal processor (ISP), or a flash such as a light emitting diode (LED) or xenon lamp.

The power manager module 295 may manage power of the electronic device 201, for example. According to an embodiment of the present disclosure, the power management module 295 may include a circuit for charging the battery 296. Although not shown, according to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or media-Flo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
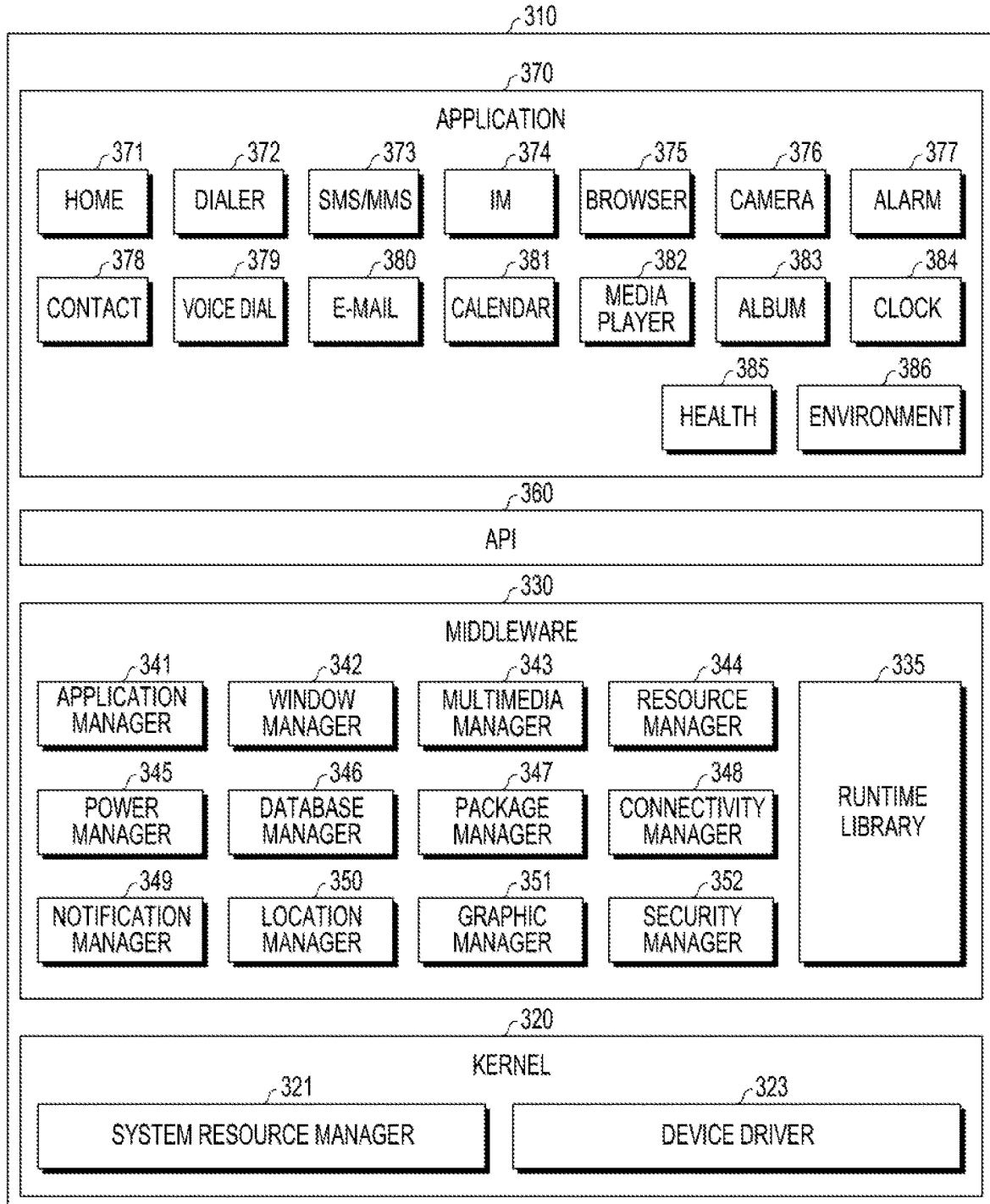
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, the program module 310 (e.g., the program 140) may include an OS controlling resources related to the electronic device (e.g., the electronic device 101) and/or various applications (e.g., the AP 147) driven on the OS. The OS may include, e.g., Android™, iOS™, Windows™, Symbian™, Tizen™, or Bada™.

The program 310 may include, e.g., a kernel 320, middleware 330, an API 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, the kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage graphical user interface (GUI) resources used on the screen. The multimedia manager 343 may grasp formats necessary to play various media files and use a codec appropriate for a format to perform encoding or decoding on media files. The resource manager

344 may manage resources, such as the source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or BT. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the OS in order to provide a differentiated function. Further, the middleware 330 may dynamically omit some existing components or add new components.

The API 360 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 370 (e.g., the AP 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (health 385) (e.g., measuring the degree of workout or blood sugar), or provision of environmental information (environment 386) (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a function (e.g., calling function or messaging function) provided from the external electronic device.

According to an embodiment of the present disclosure, the application 370 may include an application (e.g., a health-care application of a mobile medical device) designated according to an attribute of the external electronic device (e.g., the electronic devices 102 and 104).

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

According to an embodiment of the present disclosure, an electronic device may include a housing, a battery mounted in the housing, a circuit electrically connected with the battery, a conductive pattern configured to be positioned in the housing, electrically connected with the circuit, and wirelessly transmit power to an outside of the electronic device, and a connector exposed through a surface of the housing, and electrically connected with the circuit. The circuit may be configured to electrically connect the battery with the conductive pattern to wirelessly transmit the power to the outside and electrically connect the battery with the connector to wiredly transmit the power to the outside simultaneously or selectively with wirelessly transmitting the power to the outside.

According to an embodiment of the present disclosure, the circuit may be configured to change a first voltage generated by the battery into a second voltage higher than the first voltage, transmit a portion of a current generated by the second voltage to the conductive pattern, and transmit another portion of the current generated by the second voltage to the connector.

According to an embodiment of the present disclosure, the connector may further comprise a quick charging interface configured to charge another battery included in an external device to a voltage level selected from a plurality of voltage levels, and wherein the quick charging interface is electrically connected with the connector and/or the conductive pattern.

According to an embodiment of the present disclosure, the circuit may be configured to receive information on charging from the external device and select the selected voltage level from the plurality of voltage levels based on the received information.

According to an embodiment of the present disclosure, the circuit may be configured to wirelessly or wiredly transmit power to the outside based on a user input.

According to an embodiment of the present disclosure, the circuit may display information related to an external device on the display based on a signal received from the external device through the connector.

According to an embodiment of the present disclosure, the circuit may comprise a first control circuit controlling a current flow with an external device connected through the connector, a second control circuit controlling a current flow with the conductive pattern, and a third control circuit electrically connected with the first control circuit, the second control circuit, and the battery. The third control circuit may be configured to change a voltage and/or a current from the battery and provide the voltage and/or the current to the first control circuit and/or the second control circuit.

According to an embodiment of the present disclosure, at least one of the first control circuit or the second control circuit may include at least one switching element electrically connected between the connector or the third control circuit and the conductive pattern.

According to an embodiment of the present disclosure, the at least one switching element may include at least two transistor elements connected in series between the connector or the third control circuit and the conductive pattern.

According to an embodiment of the present disclosure, the third control circuit may include a buck/boost converter and a logic circuit controlling the converter.

According to an embodiment of the present disclosure, the third control circuit may further include a charging switching circuit electrically connected between the buck/boost converter and the battery. The logic circuit may control the charging switching circuit to prevent overcharging or over-discharging of the battery.

According to an embodiment of the present disclosure, the memory may store an instruction executed to enable the processor to, when the electronic device is connected with an external wireless power supply device and an on-the-go (OTG) device, allow the electronic device to receive power from the external wireless power supply device to charge the battery and simultaneously to perform an OTG function.

According to an embodiment of the present disclosure, the memory may store an instruction executed to enable the processor to, when the electronic device is connected with a wired power supply device and a wireless power receiving device, allow the electronic device to receive power from the wired power supply device to charge the battery and simultaneously to supply power to the wireless power receiving device.

According to an embodiment of the present disclosure, the memory may store an instruction executed to enable the processor to, when the electronic device is connected with an external wireless power receiving device and an OTG device, allow the electronic device to supply power to the wireless power receiving device using the battery and simultaneously to perform an OTG function.

According to an embodiment of the present disclosure, the circuit may include at least one of a general process, a microprocessor, a logic circuit, firmware, an application program, or an IC.

According to an embodiment of the present disclosure, the electronic device may comprise a housing, a power interface connectable with an external power source, a circuit electrically connected with the power interface, a conductive pattern positioned in the housing, electrically connected with the circuit, and configured to wirelessly transmit power to an outside of the electronic device, and a connector exposed through a surface of the housing and electrically connected with the circuit. The circuit may be configured to electrically connect the power interface with the conductive pattern to wirelessly transmit the power to the outside and electrically connect the power interface with the connector to wiredly transmit the power to the outside simultaneously or selectively with wirelessly transmitting the power to the outside.

According to an embodiment of the present disclosure, an electronic device may comprise a housing, a battery mounted in the housing, a circuit electrically connected with the battery, a conductive pattern positioned in the housing, electrically connected with the circuit, and configured to wirelessly transmit power to an outside of the electronic device, and a connector exposed through a surface of the housing, and electrically connected with the circuit. The circuit is configured to electrically connect the battery with the conductive pattern to wirelessly transmit the power to the outside and electrically connect the battery with the connector to wiredly transmit the power to the outside simultaneously or selectively with wirelessly transmitting the power to the outside.

According to an embodiment of the present disclosure, an electronic device may comprise a housing, a battery mounted in the housing, a circuit electrically connected with the battery, a first conductive pattern and a second conductive pattern positioned in the housing, electrically connected with the circuit, and configured to wirelessly transmit power to an outside of the electronic device or receive the power from the outside, and a connector exposed through a surface of the housing and electrically connected with the circuit. The circuit may be configured to wirelessly receive first power from the outside through the second conductive pattern or wiredly receive the first power from the outside through the connector, change a first voltage generated by the battery into a second voltage higher than the first voltage, transmit a portion of a current generated by the second voltage to the first conductive pattern, and transmit another portion of the current generated by the second voltage to the connector.

Figure 4:
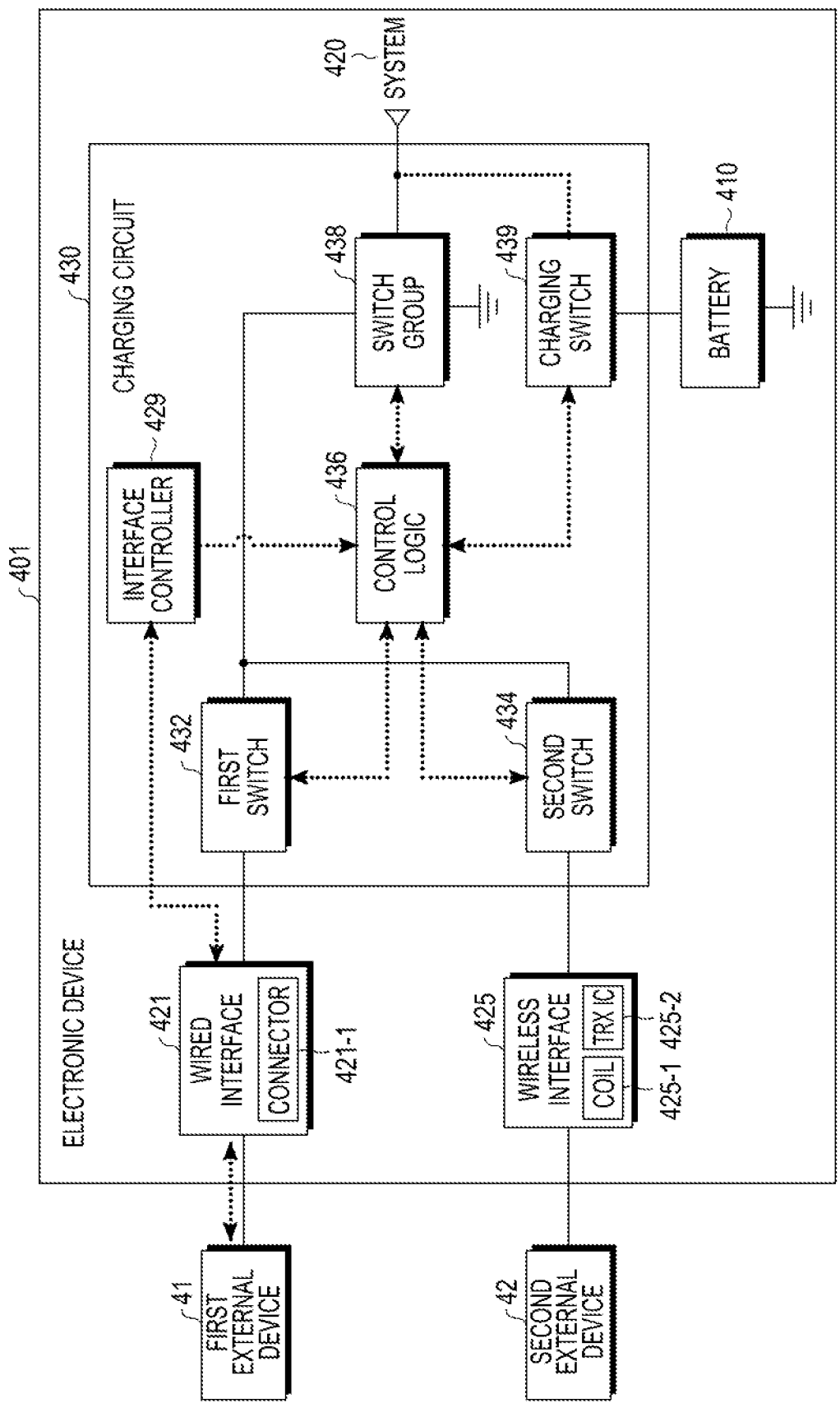
FIG. 4 is a diagram illustrating a charging circuit of an electronic device according to an embodiment of the present disclosure.

FIG. 4 is a diagram illustrating a charging circuit in an electronic device according to an embodiment of the present disclosure.

Referring to FIG. 4, according to an embodiment of the present disclosure, an electronic device 401 may include a battery 410, a wired interface 421, a wireless interface 425, and a charging circuit 430.

The battery 410 may be mounted in a housing of the electronic device and may be charged. The battery 410 may include, but not limited to, a rechargeable battery and/or a solar battery.

The wired interface 421 and the wireless interface 425 may be mounted in a portion of the housing of the electronic device and may be respectively connected to an external device. The wired interface 421 may include a connector 421-1, e.g., for an USB and the wired interface 421 may be wiredly connected with a first external device 41 through the connector 421-1. The wireless interface 425 may include a coil 425-1 (also known as a "conductive pattern") and a transmit/receive integrated chip (TRX IC) 425-2 and the wireless interface 425 may wirelessly transmit or receive power from a second external device 42 through the conductive pattern 425-1 and the TRX IC 425-2. Wireless power may be transmitted and received using a wireless power transmission method including a magnetic inductive coupling method, a resonance coupling method, or a combination thereof. According to an embodiment of the present disclosure, the conductive pattern 425-1 may include a first conductive pattern for transmitting wireless power and a second conductive pattern for receiving wireless power.

The first external device 41 may be an external device connectable via a wired manner including a wired power supply device, a wired power receiving device, or an on-the-go (OTG) device. The OTG device may be a device performing an OTG function in which the OTG device is connected to an electronic device to transfer data, such as, a PDA, an MP3 player, a mobile phone, a mouse, a keyboard, an USB memory, and a health care accessory. The wired power supply device may be a device, e.g., a travel adapter (TA), which is wiredly connected to the electronic device to supply power thereto. The wired power receiving device may be a device wiredly connected to receive power from the electronic device and charge other batteries provided in the wired power receiving device. According to an embodiment of the present disclosure, the first external device connected to the electronic device 401 through the wired interface 421 may include a wired high voltage (HV) device (e.g., a device supporting an adaptive fast charge (AFC)). When a wired HV device is connected to the connector, power having a higher voltage (e.g., 9 V) than a voltage supplied from the battery 410 (e.g., 5 V) may be supplied to or received from the wired HV device.

The second external device 42 may include a wireless power supply device or a wireless power receiving device. According to an embodiment of the present disclosure, the wireless power supply device may be a device, e.g., a wireless charging pad, for supplying wireless power to the electronic device using the first conductive pattern. The wireless power receiving device may be a device that receives wireless power supplied from the electronic device using the second conductive pattern and uses the received wireless power to charge other batteries included in the wireless power receiving device. According to an embodiment of the present disclosure, the second external device 42 connected to an electronic device 401 through the wireless interface 425 may include a wireless HV device (e.g., a device supporting an AFC). According to an embodiment of the present disclosure, the wireless HV device may include a wireless charging pad supporting quick charging. The wireless charging pad may determine whether to perform the quick charging by communicating with the TRX IC 425-2 through inband communication, or may determine whether to perform the quick charging by using a separate communication module (e.g., BT or Zigbee). For example, the electronic device 401 may send a request for, e.g., HV charging of 9V, to a wireless charging pad through the TRX IC 425-2. The wireless charging pad may determine a possibility of the quick charging through communication with the electronic device 401 according to the request for HV charging from the electronic device 401. When the quick charging is available, the wireless charging pad may supply 9 V of power to the electronic device 401.

The charging circuit 430 may be electrically connected with the battery 410 and the charging circuit 430 may be configured to electrically connect the battery 410 with the wired interface 421, and to electrically connect the battery 410 with the wireless interface 425. The charging circuit 430 may be configured to electrically connect the battery 410 with the conductive pattern (e.g., the first conductive device) to wirelessly transmit power to the second external device 42 (e.g., the wireless power receiving device). Simultaneously, the charging circuit 430 may be configured to connect the battery 410 with the connector to wiredly transmit power to the first external device 41 (e.g., the wired power receiving device). For example, the charging circuit 430 may change first power generated by the battery into second power higher than the first power, such that the charging circuit 430 may transmit third power that is at least a portion of the second power to the wireless power receiving device through the first conductive pattern and transmit fourth power that is at least a portion of the second power to an OTG device or a wired power receiving device through the connector. Further, the charging circuit 430 may transmit the third power that is at least a portion of the second power to an external wireless power receiving device through the first conductive pattern, and simultaneously transmit the fourth power that is at least a portion of the second power to an OTG device or a wired power receiving device through the connector.

According to an embodiment of the present disclosure, the charging circuit 430 may include an interface controller 429, a second switch 434, a first switch 432, a control logic 436, a switch group 438, and a charging switch 439.

The interface controller 429 may determine a type of the first external device 41 connected to the wired interface 421 and determine whether the quick charging is supported through adaptive fast charge (AFC) communication with the first external device 41. According to an embodiment of the present disclosure, the interface controller 429 may include a micro sub interface IC (MUIC) or an AFC interface. For example, the AFC interface may determine whether the quick charging is supported through AFC communication with the first external device 41. When the quick charging is supported, the first external device 41 may increase transmitting/receiving power. For example, when the first external device 41 is a wired power supply device typically transmitting 10 W of power (10 W=5 V*2 A), when the quick charging is supported, 18 W (18 W=9V*2 A) of power may be transmitted.

The first switch 432 may include at least one or more switches. The first switch 432 may control a power output to a device, e.g., an OTG device, which is connected through the wired interface 421, e.g., the connector 421-1, or to the wired power receiving device. The first switch 432 may control a power input from the wired power supply device. For example, the first switch 432 may be turned on to allow power to be outputted to a device, e.g., the OTG device connected via the wired interface 421, for example, the connector 421-1. For example, the first switch 432 may be turned "on" to allow the power output to a device, e.g. the OTG device or the wired power receiving device, and the power input from the wired power supply device. The first switch 432 may be turned "off" to prevent the power output to a device, e.g. the OTG device or the wired power receiving device, and the power input from the wired power supply device.

The second switch 434 may include at least one or more switches. The second switch 434 may control a power input and a power output from. e.g., the wireless power supply device and the wireless power receiving device through the wireless interface 425, e.g., the conductive pattern 425-1 and the TRX IC 425-2. For example, the second switch 434 may be turned "on" to enable the power input and output from. e.g., the wired power receiving device or the wired power supply device. The second switch 434 may be turned "off" to prevent the power input and output from. e.g., the wired power receiving device or the wired power supply device.

The control logic 436 may perform a control to convert power inputted from at least one of the first switch 432 and the second switch 434 into a charging voltage or current suitable for charging the battery 410. The control logic 436 may control power from the battery 410 to be converted into a charging voltage or current appropriate for charging other batteries of the external device connected to the first switch 432 and the second switch 434, respectively. The control logic 436 may control power from the battery 410 to be converted into a charging voltage or current suitable to be used in an external device.

The control logic 436 may perform a charging current sensing function, a charging cut off function, a constant current (CC) loop function, a constant voltage (CV) loop function, a termination current loop function, a recharging loop function, and a Bat to Sys FET loop function. The charging current sensing function may be a function to detect a charging current. The charging cut off function may be a function that stops charging the battery 410 upon overcharging or overheating. The CC loop function may be a function of controlling the CC range in which the charging current is constant. The CV loop function may be a function of controlling the CV range in which the charging voltage is constant. The termination current loop function may be a function of controlling a termination of charging. The recharging loop function may be a function of controlling a recharging. The Bat to Sys FET loop function may be a function of controlling the voltage and current between the battery 410 and the system 420.

According to an embodiment of the present disclosure, the control logic 436 may control the charging circuit 430 to selectively transmit power of the battery 410 in a wireless or wired manner to the outside. Further, the control logic 436 may transmit power to the first external device 41 and/or the second external device 42 through the charging circuit 430, or may receive power from the first external device 41 and/or the second external device 42 through the charging circuit 430.

According to an embodiment of the present disclosure, the control logic 436 may control the battery 410 to be charged using power received from the wired power supply device when the wired power supply device is connected. Further, the control logic 436 may control the OTG device to perform an OTG function when the OTG device is connected. Further, the control logic 436 may control the battery 410 to be charged by receiving the power from the wireless power supply device. Further, the control logic 436 may control charging the battery 410 and performing the OTG function by receiving the power from the wireless power supply device when the wireless power supply device and the OTG device are connected. Further, the control logic 436 may be control supplying power to the wireless power receiving device using the power of the battery 410 when the wireless power receiving device is connected. Further, the control logic 436 may control receiving power from the wired power supply device to charge the battery 410 and simultaneously supplying power to the wireless power receiving device, when the wired power supply device and the wireless power receiving device are connected. The control logic 436 may control performing the OTG function and simultaneously supplying power to the wireless power receiving device using the power of the battery, when the OTG device and the wireless power receiving device are connected.

The switch group 428 may provide a CC to a system (e.g., a system for supplying power to each module of the electronic device). The switch group 428 may boost or buck a voltage of the battery 410 to supply a CC to the connected external device, or may boost or buck a supplied charging voltage to supply constant charging current to the battery 410. According to an embodiment of the present disclosure, the switch group 428 may include a buck/boost converter.

The charging switch 439 may detect a charging current amount and may block charging of the battery 410 upon overcharging or overheating.

According to an embodiment of the present disclosure, the electronic device 401 may include a display. The display may display a user interface that is configured to control at least a portion of the charging circuit 430. The display may receive a user input to wirelessly or wiredly transmit power from the battery 410 to an external device. The display may display at least one or more external devices connected to the electronic device 401 and may display remaining battery power of the external device. Further, the display may display whether power is supplied to the connected external device or power is received therefrom. The display may be connected with a plurality of external devices. When power is respectively supplied to a plurality of the external devices, the display may display a screen capable of adjusting distribution of power respectively provided to a plurality of the external devices. The display may display a screen capable of selecting a priority for providing power to a plurality of the external devices. Further, the display may display a screen capable of displaying information on the display of the connected external device. At least a portion of the content displayed on the display may be changed according to a signal received from the connected external device.

FIGS. 5A, 5B, 5C, 5D, 5E, 5F, 5G, and 5H are views illustrating a charging circuit and an operation of the charging circuit in an electronic device according to various embodiments of the present disclosure.

Figure 5A:
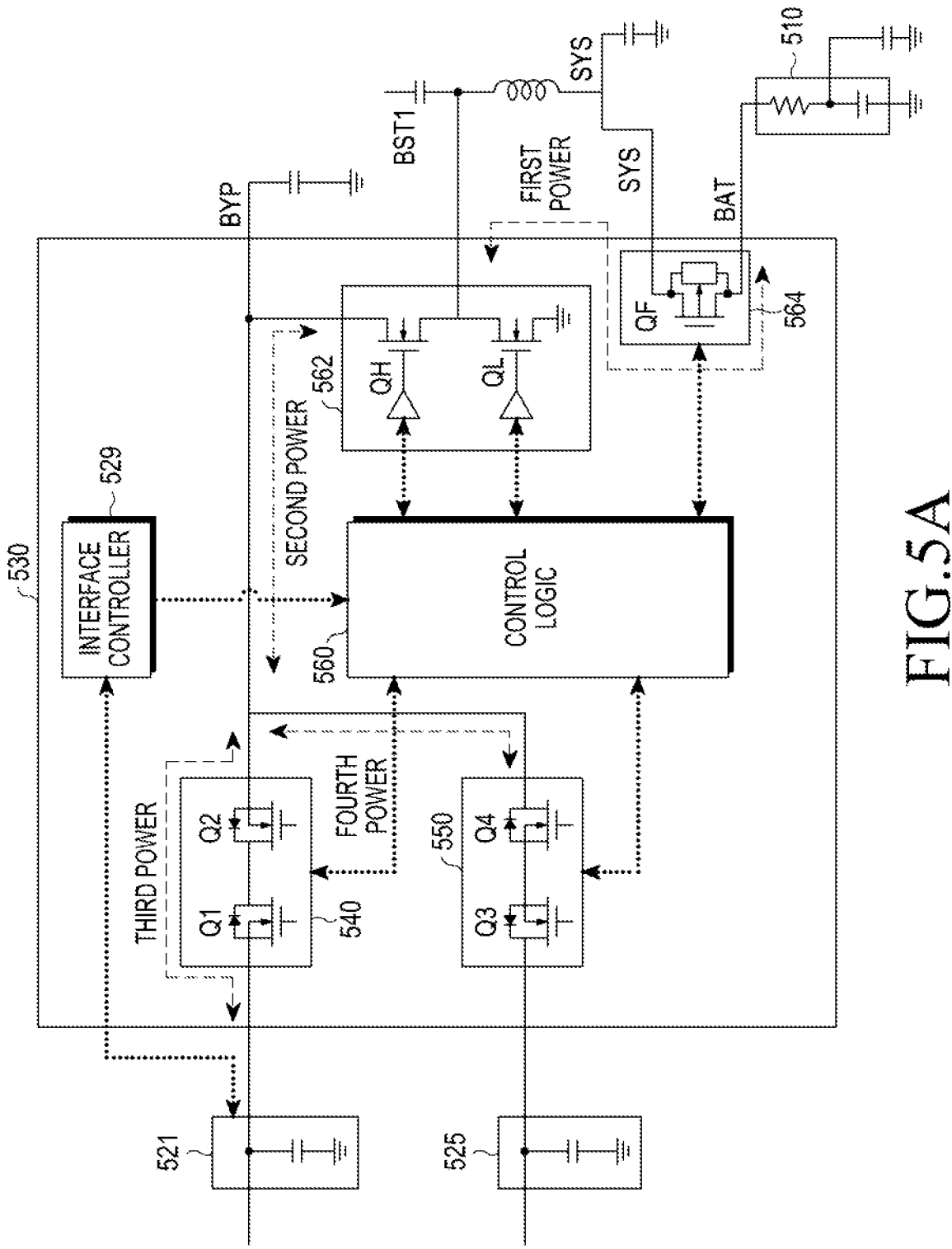
FIGS. 5A, 5B, 5C, 5D, 5E, 5F, 5G, and 5H are views illustrating a charging circuit of an electronic device and an operation of the charging circuit according to various embodiments of the present disclosure.

Referring to FIG. 5A, a charging circuit 530 may be configured to electronically connect a battery 510 with a wired interface 521 and connect a battery 510 with a wireless interface 525. According to an embodiment of the present disclosure, the charging circuit 530 may include an interface controller 529, a first switch 540, a second switch 550, a control logic 560, a switch group 562, and a charging switch 564.

The interface controller 529 may determine a type of the first external device connected to the wired interface 421 and determine whether the first external device supports quick charging According to an embodiment of the present disclosure, the interface controller 529 may include a MUIC or an AFC interface. For example, the MUIC may determine whether the first external device connected with the wired interface 521 is a wired power supply device, a wired power receiving device or the OTG device. For example, the AFC interface may determine whether the quick charging is supported through AFC communication with the first external device 41. When the quick charging is supported, the first external device 41 may increase transmitting/receiving power.

The first switch 540 may include a 1-1 switch Q1 and a 1-2 switch Q2, and may control an input and output of power through the wired interface 521 by using an "on" or "off" operation of the 1-1 switch Q1 and the 1-2 switch Q2. For example, when the 1-1 switch Q1 and the 1-2 switch Q2 is turned on, the input and output of the power to the external device connected through the wired interface 521 may be possible. When the 1-1 switch Q1 and the 1-2 switch Q2 is turned off, the input and output of the power to the external device connected through the wired interface 521 may be impossible. According to an embodiment of the present disclosure, the 1-1 switch Q1 and the 1-2 switch Q2 may be configured to be in a back to back manner, e.g., arranged to face each other, thereby preventing power from flowing into the second switch 550.

The second switch 550 may include a 2-1 switch Q3 and a 2-2 switch Q4, and may control a power input and a power output through the wired interface 521 by using an "on" or "off" operation of the 2-1 switch Q3 and the 2-2 switch Q4. For example, when the 2-1 switch Q3 and the 2-2 switch Q4 is turned on, the input/output of the power to the external device connected through the wireless interface 525 may be possible. When the 2-1 switch Q3 and the 2-2 switch Q4 is turned off, the input/output of the power to the external device connected through the wireless interface 525 may be impossible. According to an embodiment of the present disclosure, the 2-1 switch Q3 and the 2-2 switch Q4 may be configured to be in a back to back manner, e.g., arranged to face each other, thereby preventing power from flowing into the first switch 540.

The control logic 560 may perform a control to convert power inputted from at least one of the first switch 540 and the second switch 550 into a charging voltage or current appropriate for charging the battery 510. The control logic 560 may control power from the battery 510 to be converted into a charging voltage or current appropriate for charging other batteries of the external device connected with the first switch 540 and the second switch 550, respectively.

For example, the control logic 560 may change first power generated by the battery to second power higher than the first power level, or may control the switch group 562 to convert the first power into the second power. Further, the control logic 560 may control the 1-1 switch Q1 and the 1-2 switch Q2 to transmit and receive third power through the wired interface 521, and may control the 2-1 switch Q3 and the 2-2 switch Q4 to transmit and receive fourth power through the wireless interface 525. The control logic 560 may perform a charging current sensing function, a charging cut off function, a CC loop function, a CV loop function, a termination current loop function, a recharging loop function, and a Bat to Sys FET loop function.

The switch group 562 may include a plurality of switches. The switch group 562 may provide a CC to a system (e.g., a system for supplying power to each module of the electronic device). The switch group 428 may boost or buck a voltage of the battery 410 to supply CC to the connected external device, or may boost or buck a supplied charging voltage to supply the constant charging current to the battery 410. According to an embodiment of the present disclosure, the switch group 428 may include a buck/boost converter.

According to an embodiment of the present disclosure, when charging power is supplied to the battery 510 from the external device (e.g., TA), the switch group 562 may boost or buck a charging voltage according to a CC range and a CV range. According to an embodiment of the present disclosure, the CC range may be a range providing the battery 510 with the charging voltage having a CC. The CV range may be a range providing the battery 510 with the charging voltage having a CV.

According to an embodiment of the present disclosure, the switch group 562 may perform a buck converter operation in the CC range. For example, the switch group 562 may perform the buck converter operation in which the charging current may be fixed as a predetermined current level (e.g., 3 A) and charged in a range where the voltage of the battery 510 increases to a predetermined range (e.g., 3.4 V~4.4 V). Here, the switch group 562 may perform an operation to convert a voltage inputted from the external device into a voltage suited for the battery 510. For example, the switch group 562 may supply 9 W (9 W=3 V*3 A) of power from the external device to the battery 510 when the voltage of battery 510 is 3 V, and supply 12 W (12 W=4 V*3 A) of power from the external device to the battery 510 when the voltage of battery 510 is 4 V, such that a charging current from the external device is uniformly supplied to the battery 510.

According to an embodiment of the present disclosure, the switch group 562 may perform the buck converter operation in the CV range. For example, the switch group 562 may enter the CV range, fix a charging voltage with a buffer voltage, and gradually reduce the current so as to perform charging, because charging is unnecessary when the voltage of the battery 510 reaches a buffer voltage (e.g., 4.4 V) range. Here, the switch group 562 may perform an operation to convert a voltage (e.g., 5 V) inputted from the external device to a voltage suited for a buffer voltage (e.g. 4.4 V) of the battery 510.

According to an embodiment of the present disclosure, the switch group 562 may perform the boost converter operation when power of battery 501 is provided to the external device. For example, the switch group 562 may perform an operation of converting a voltage of the battery 510 (e.g., 3.4 V~4.4 V) to a voltage suited for the OTG device (e.g., 5 V) when power of battery 510 is provided to the OTG device connected to the electronic device.

The charging switch 564 may detect a charging current amount, and may block charging of the battery 410 upon overcharging or overheating.

Figure 5B:
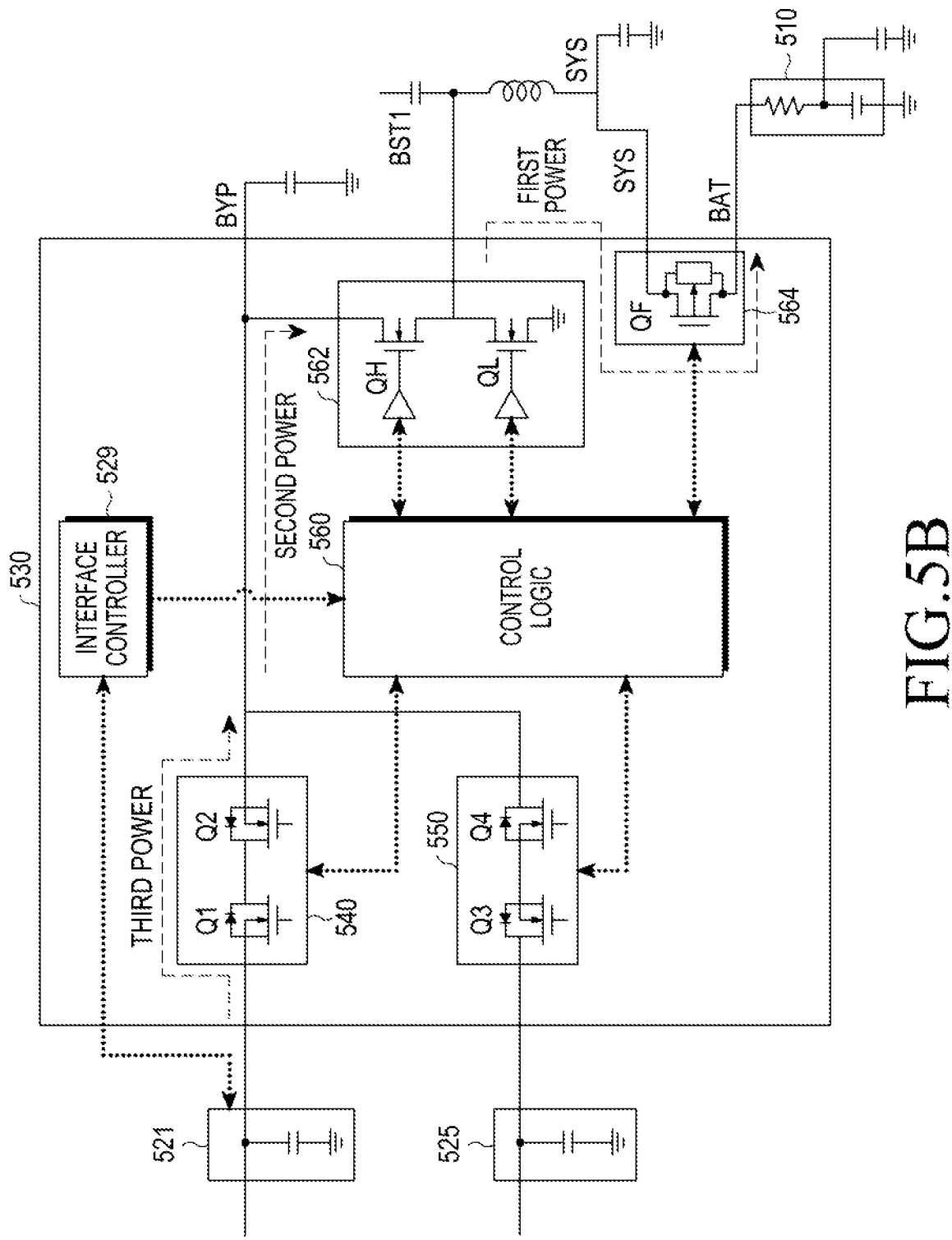

Referring to FIG. 5B, which is a view illustrating an operation of a charging circuit 530 when the wired power supply device is connected to the wired interface 521. When the wired power supply device is connected to the wired interface 521, a control logic 560 may control a 1-1 switch Q1 and a 1-2 switch Q2 to be "on" state. The control logic 560 may receive third power through the wired interface 521. The control logic 560 may control to input third power to a switch group 562 as second power. The control logic 560 may control the switch group 562 to buck a voltage of the second power to a voltage of the first power. The converted first power may be supplied to the battery 510 through a charging switch 564 to be used for charging the battery 510. According to an embodiment of the present disclosure, when the voltage of the second power is bucked to the voltage of the first power, the switch group 562 may perform the buck converter operation in which the charging current may be fixed as a predetermined current level (e.g., 3 A) and charged in a CC range where the voltage of the battery 510 increases to a predetermined range (e.g., 3.4 V~4.4 V). Specifically, the switch group 562 may supply 9 W (9 W=3 V*3 A) of power from the wired power supple device to the battery 510 when the voltage of battery 510 is 3 V, and supply 12 W (12 W=4 V*3 A) of power from the wired power supple device to the battery 510 when the voltage of battery 510 is 4 V, such that a charging current from the wired power supple device is uniformly supplied to the battery 510. Further, the switch group 562 may enter the CV range, fix a charging voltage with a buffer voltage, and gradually reduce the current so as to perform charging, because charging is unnecessary when the voltage of the battery 510 reaches a buffer voltage (e.g., 4.4 V). Here, the switch group 562 may perform an operation to convert a voltage inputted from the external device into a voltage suited for the battery 510.

Figure 5C:
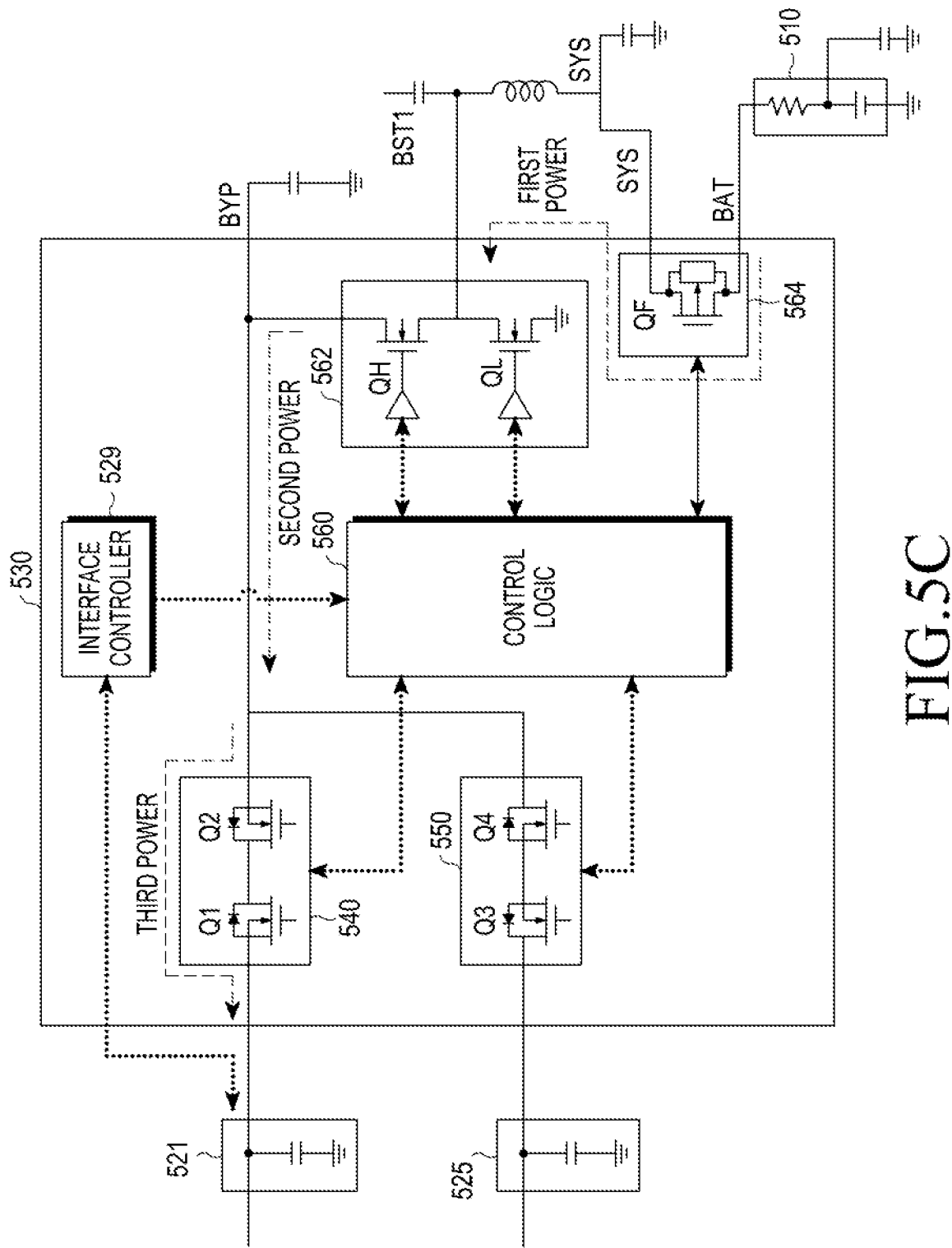

Referring to FIG. 5C, which is a view illustrating an operation of a charging circuit 530 when an OTG device is connected to a wired interface 521. When the OTG device is connected to the wired interface 521, a control logic 560 may control a switch group 562 so that a switch group 562 boosts a voltage of first power from a battery 510, which is provided through a charging switch 564, to a voltage of second power. Here, the switch group 562 may perform a boost converter operation. For example, the switch group 562 may perform an operation to convert a voltage of the battery 510 (e.g., 3.4 V~4.4 V) to a voltage (e.g., 5 V) suited for the OTG device. Further, the control logic 560 may control a 1-1 switch Q1 and a 1-2 switch Q2 to be on-state, such that second power is transmitted to the OTG device as third power through the wired interface 521.

Figure 5D:
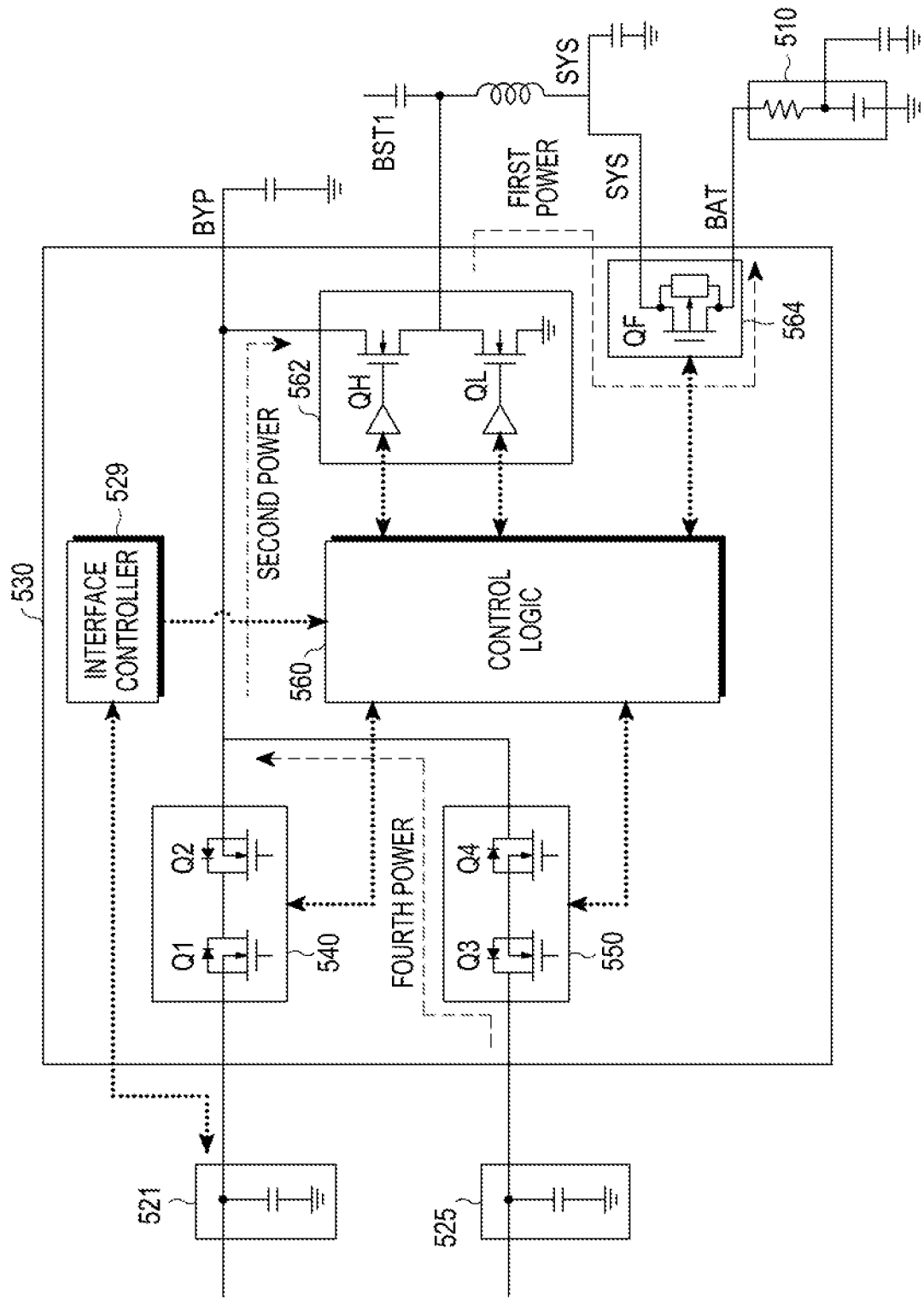

Referring to FIG. 5D, which is a view illustrating an operation of a charging circuit 530 when a wireless power supply device is connected to a wireless interface 525. When the wireless power supply device is connected to the wireless interface 525, the control logic 560 may control a 2-1 switch Q3 and a 2-2 switch Q4 to be on-state, such that fourth power is received from the wireless power supply through the wireless interface 525. Further, the control logic 560 may perform a control to input the fourth power to the switch group 562, the control logic 560 may control the switch group 562 to buck a voltage of the second power to a voltage of the first power.

According to an embodiment of the present disclosure, when a voltage of the second power is bucked to a voltage of the first power, the switch group 562 may perform a buck converter operation in which the charging current may be fixed as a predetermined current level (e.g., 3 A) in a CC range where the voltage of the battery 510 increases to a predetermined value (e.g., 3.4 V~4.4 V). Specifically, the switch group 562 may supply 9 W (9 W=3 V*3 A) of power from the wireless power supply device to the battery 510 when the voltage of battery 510 is 3 V, and supply 12 W (12 W=4 V*3 A) of power from the wireless power supply device to the battery 510 when the voltage of battery 510 is 4 V, such that a charging current from the wireless power supply device is uniformly supplied to the battery 510.

Further, the switch group 562 may enter the CV range, fix a charging voltage with a buffer voltage, and gradually reduce the current so as to perform charging, because charging is unnecessary when the voltage of the battery 510 reaches a buffer voltage (e.g., 4.4 V) range. Here, the switch group 562 may perform an operation to convert a voltage (e.g., 5 V) inputted from the wireless power supply device into a voltage suited for a buffer voltage (e.g. 4.4 V). The first power may be supplied to the battery 510 through the charging switch 564 and used to charge the battery 510.

According to an embodiment of the present disclosure, an electronic device may determine whether the wireless power supply device supports quick charging by communicating with the wireless power supply device. According to an embodiment of the present disclosure, the electronic device may receive identifying information from the wireless power supply device and determine whether the wireless power supply device supports the quick charging through the identifying information. The operation of receiving the identifying information may be performed through the wireless power supply device and one of an in-band communication channel and an outband communication channel. An in-band communication method means that the electronic device communicates with the wireless power supply device in a same frequency as frequency used in wireless power transmission. An out-band communication method means that the electronic device communicates with the wireless power supply device in a different frequency from the frequency used in wireless power transmission. According to an embodiment of the present disclosure, the out-band communication method may include a short-range communication protocol (e.g., BT, Wi-Fi, NFC, etc.). According to an embodiment of the present disclosure, the electronic device may determine whether the wireless power supply device supports the quick charging using the inband or outband communication.

Figure 5E:
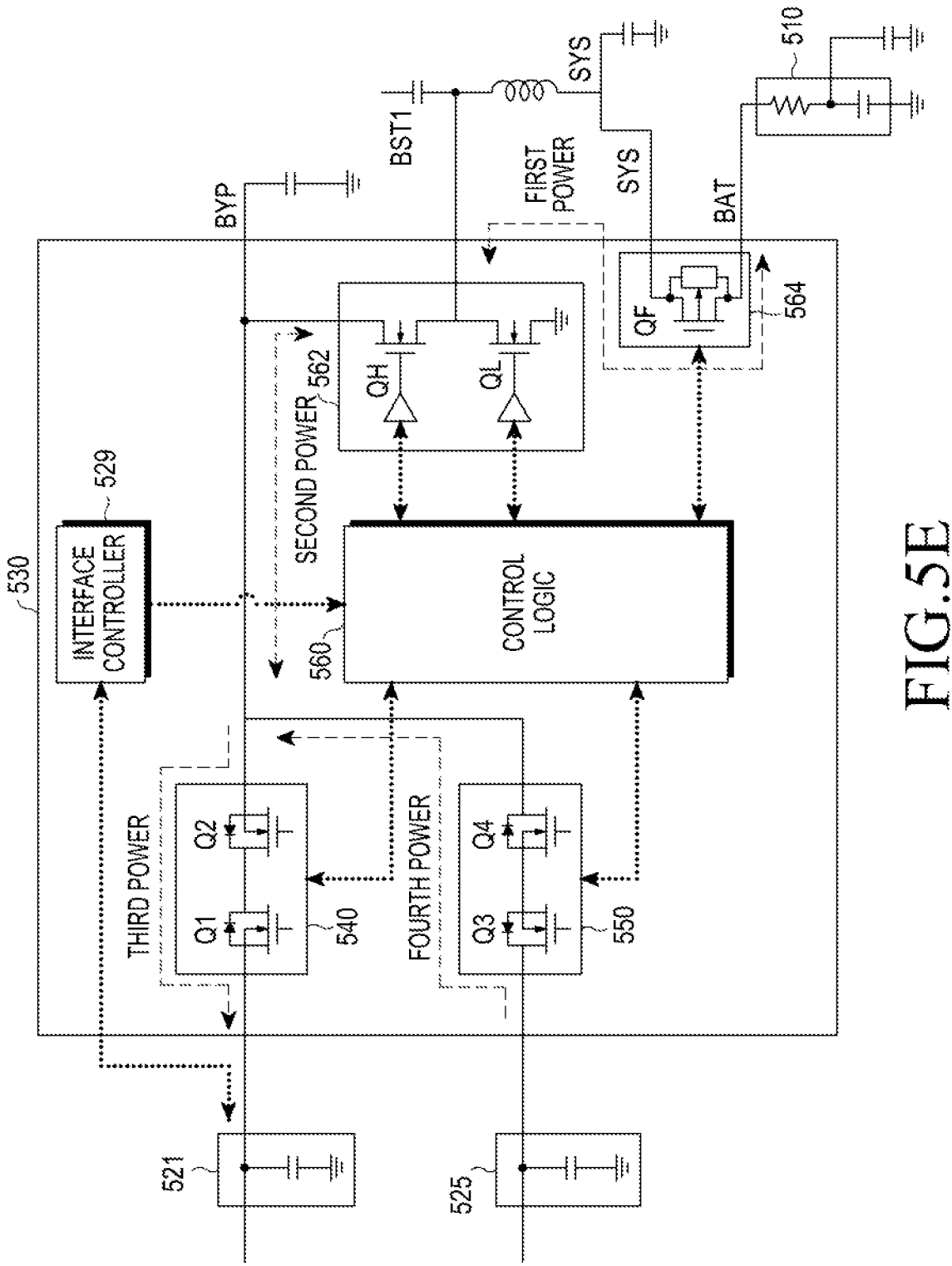

Referring to FIG. 5E, which is a view illustrating an operation of a charging circuit 530 when an OTG device is connected to a wired interface 521 and a wireless power supply device is connected to a wireless interface 525. When the OTG device is connected to the wired interface 521 and the wireless power supply device is connected to the wireless interface 525, the control logic 560 may control the switch group 562 to boost a voltage of first power from a battery 510 to a voltage of second power. The control logic 560 may control a 1-1 switch Q1 and a 1-2 switch Q2 to be on-state to thus transmit third power to the OTG device, and simultaneously control a 2-1 switch Q3 and a 2-2 switch Q4 to be on-state to receive fourth power. The control logic 560 may control the switch group 562 to buck a voltage of the second power corresponding to fourth power to a voltage of the first power, such that the first power may be charged to the battery 510. According to an embodiment of the present disclosure, the switch group 562 may perform an operation to convert a voltage of the battery 510 (e.g., 3.4 V~4.4 V) to a voltage suited for the OTG device (e.g., 5 V) when the voltage of first power from the battery 510 is boosted to the voltage of the second power. According to an embodiment of the present disclosure, when a voltage of the second power corresponding to the fourth power is bucked to a voltage of the first power, the switch group 562 may perform a buck converter operation in which the charging current may be fixed as a predetermined current value (e.g., 3 A) and charged in a range where a voltage of the CC range (the voltage of the battery 510) increases to a predetermined range (e.g., 3.4 V~4.4 V) range. Specifically, the switch group 562 may supply 9 W (9 W=3 V*3 A) of power the wireless power supply device to the battery 510 when the voltage of battery 510 is 3 V, and supply 12 W (12 W=4 V*3 A) of power from the wireless power supply device to the battery 510 when the voltage of battery 510 is 4 V, such that a charging current from the wireless power supply device is uniformly supplied to the battery 510. Further, the switch group 562 may enter the CV range, fix a charging voltage with a buffer voltage, and gradually reduce the current so as to perform charging, because charging is unnecessary when the voltage of the battery 510 reaches a buffer voltage (e.g., 4.4 V). Here, the switch group 562 may perform an operation to convert a voltage inputted from the wireless power supply device into a voltage suited for the battery 510.

According to an embodiment of the present disclosure, when the fourth power received from the wireless power supply device through the wireless interface 525 is bigger than the third power transmitted to the OTG device through the wired interface 521, a control logic 560 may supply the third power to the OTC device using the fourth power. The control logic 560 may perform a control to input a remaining power to a switch group 562, thereby providing the remaining power to the battery 510. Further, when the fourth power received from the wireless power supply device through the wireless interface 525 is smaller than the third power transmitted to the OTG device through the wired interface 521, a control logic 560 may supply power to the OTC device using the fourth power. The control logic 560 may perform a control to supplement the OTG device with power provided by using the battery 510 and the switch group 562.

Figure 5F:
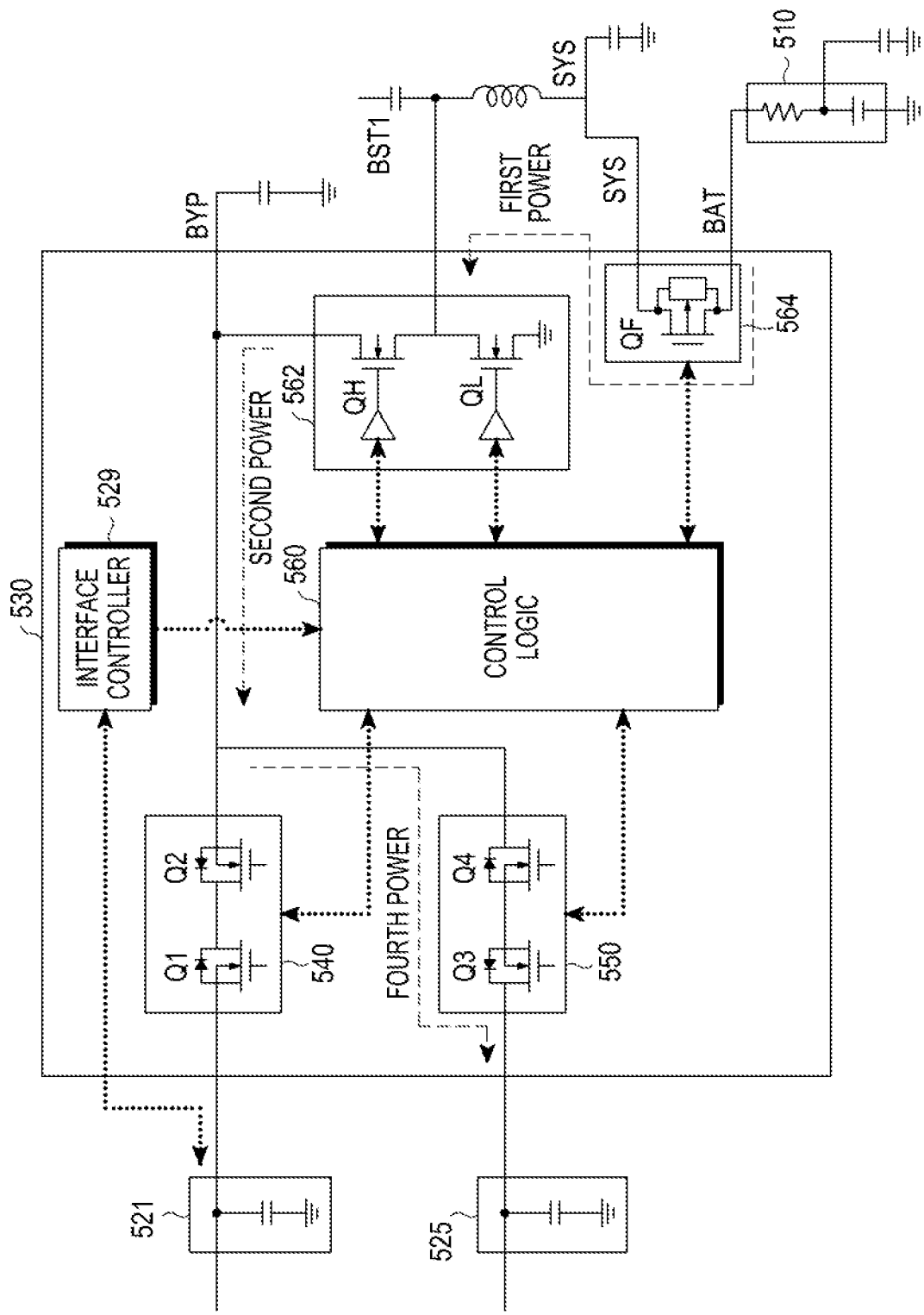

Referring to FIG. 5F, which is a view illustrating an operation of a charging circuit 530 when a wireless power receiving device is connected to a wireless interface 525.

When a wireless power receiving device is connected to a wireless interface 525, a control logic 560 may control a switch group 562 to boost a voltage of first power from a battery 510 supplied through a charging switch 564 into a voltage of second power. According to an embodiment of the present disclosure, when a voltage of first power from the battery is boosted to a voltage of second power, the switch group 562 may perform an operation to convert a voltage of the battery 510 (e.g., 3.4 V~4.4 V) to a voltage suited for the wireless power receiving device. Further, the control logic 560 may control a 2-1 switch Q3 and a 2-2 switch Q4 to be on-state so that second power is transmitted to the wireless power receiving device through the wired interface 521 as fourth power.

Figure 5G:
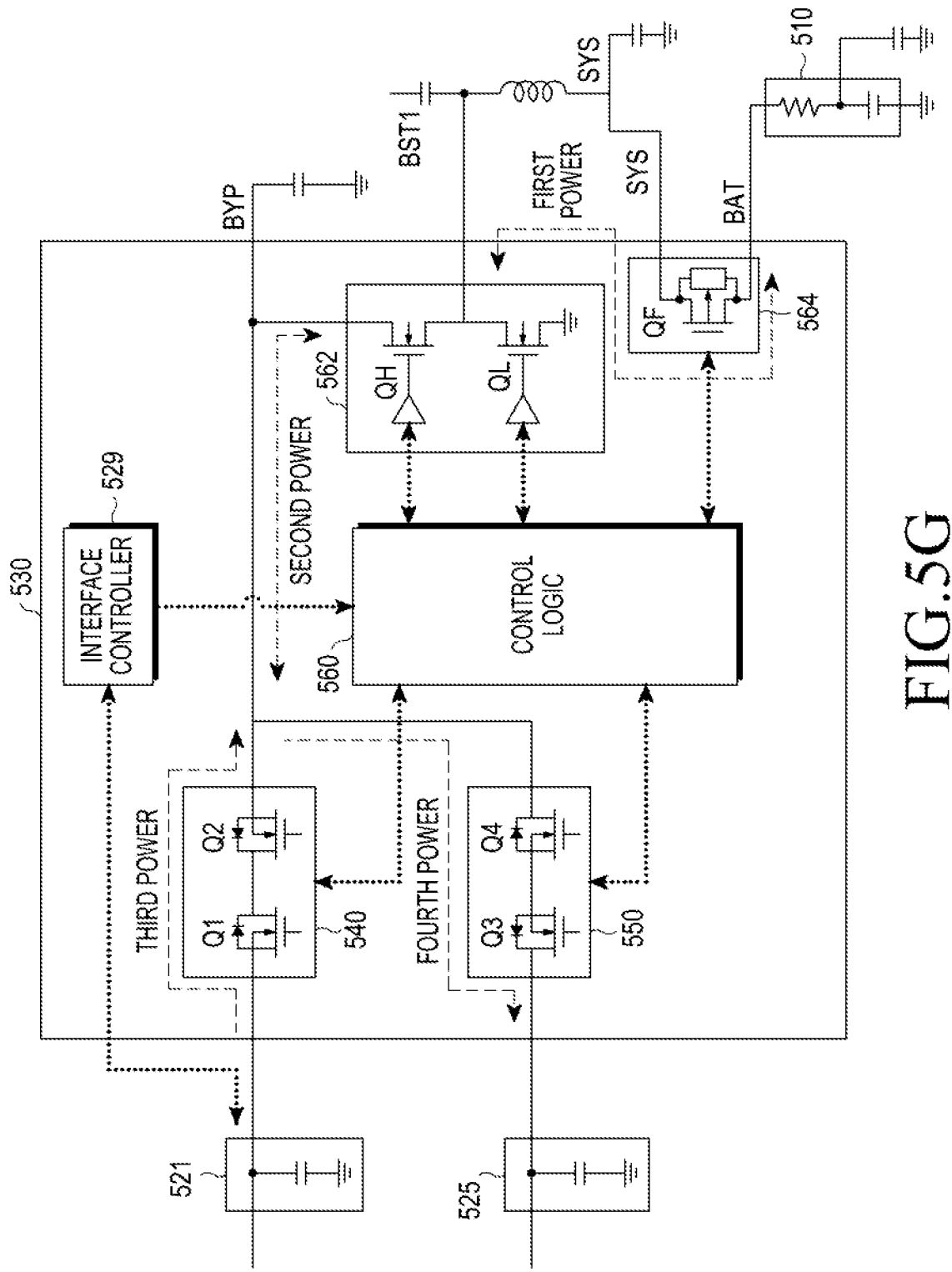

Referring to FIG. 5G, which is a view illustrating an operation of a charging circuit when a wired power receiving device is connected to a wired interface 521, and a wireless power receiving device is connected to a wireless interface 525. When a wired power receiving device is connected to a wired interface 521, and a wireless power receiving device is connected to a wireless interface 525, A control logic 560 may control a 1-1 switch Q1 and a 1-2 switch Q2 to be on-state to thus receive third power. While the control logic 560 may control the switch group 562 to buck a voltage of second power corresponding to third power to a voltage of first power, the control logic 560 may control the switch group 562 to boost the voltage of the first power to the voltage of the second power, and the control logic 560 may control a 2-1 switch Q3 and a 2-2 switch Q4 to be on-state to thus transmit fourth power to the wireless power receiving device.

According to an embodiment of the present disclosure, when the voltage of the second power is bucked to the voltage of the first power, the switch group 562 may perform the buck converter operation in which the charging current may be fixed as a predetermined current level (e.g., 3 A) and charged in a range where the voltage of the battery 510 increases to a predetermined range (e.g., 3.4 V~4.4 V). Specifically, the switch group 562 may supply 9 W (9 W=3 V*3 A) of power from the wired power supply device to the battery 510 when the voltage of battery 510 is 3 V, and supply 12 W (12 W=4 V*3 A) of power from the wired power supply device to the battery 510 when the voltage of battery 510 is 4 V, such that a charging current from the wired power supply device is uniformly supplied to the battery 510. Further, the switch group 562 may enter the CV range, fix a charging voltage with a buffer voltage, and gradually reduce the current to perform charging because charging is unnecessary when the voltage of the battery 510 reaches a buffer voltage (e.g., 4.4 V) range. Here, the switch group 562 may perform an operation to convert a voltage (e.g., 5 V) inputted from the wired power supply device to a voltage suited for a buffer voltage (e.g. 4.4 V). According to an embodiment of the present disclosure, when a voltage of first power from the battery is boosted to a voltage of second power, the switch group 562 may perform an operation to convert a voltage of the battery 510 (e.g., 3.4 V~4.4 V) to a voltage suited for a voltage of the wireless power receiving device.

According to an embodiment of the present disclosure, when a control logic 560 supplies fourth power to the wireless power receiving device while receiving third power from the wired power supply device, the control logic 560 may perform a control to supply fourth power to a wireless power receiving device using third power from the wired power supply device, and then charge the battery 510 using the remaining power.

Figure 5H:
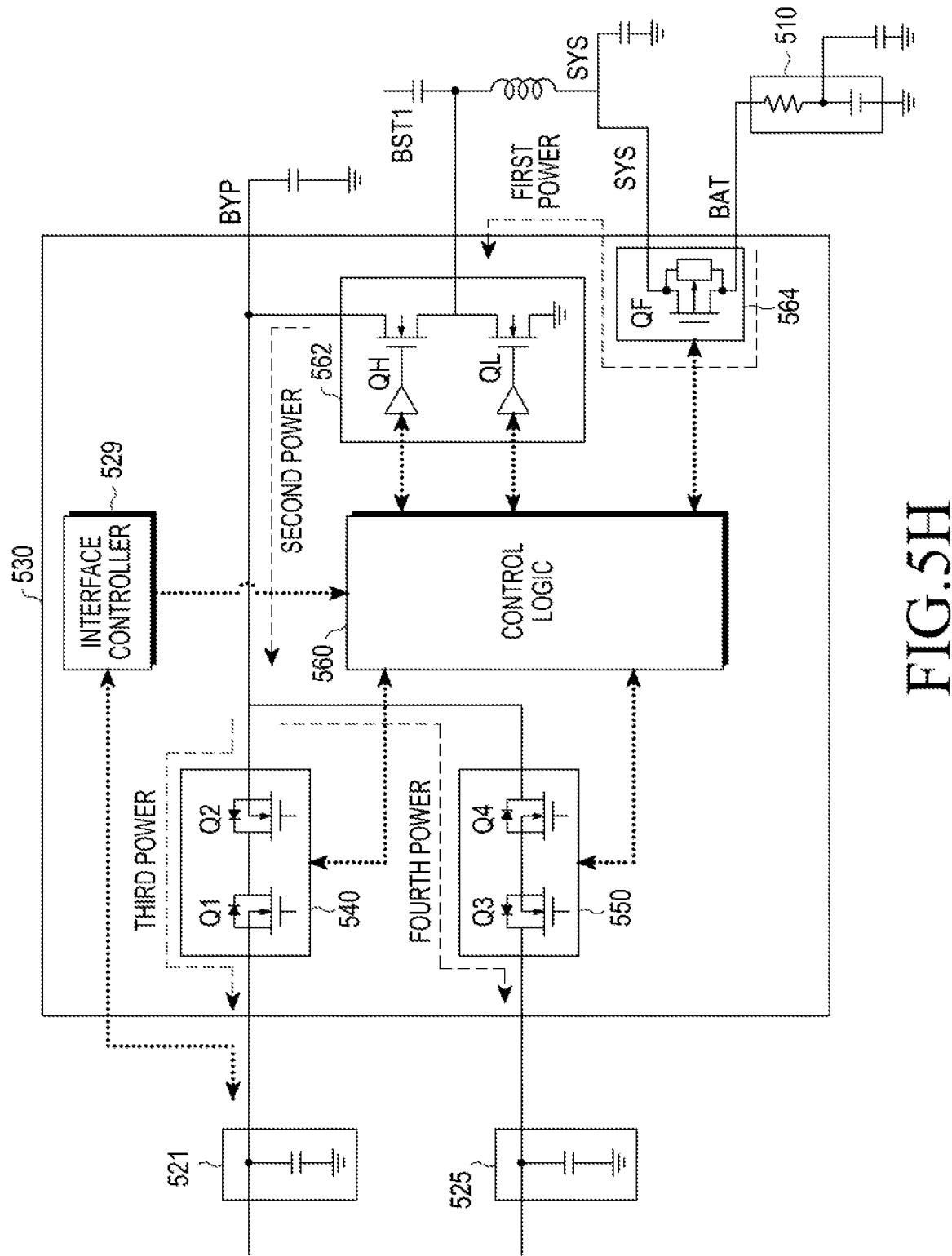

Referring to FIG. 5H, which is a view illustrating an operation of a charging circuit 530 when an OTG device is connected to a wired interface 521 and a wireless power receiving device is connected to a wireless interface 525. When the OTG device is connected to the wired interface 521 and the wireless power supply device is connected to the wireless interface 525, a control logic 560 may control a switch group 562 to boost a voltage of first power from a battery 510 to a voltage of second power. According to an embodiment of the present disclosure, the switch group 562 may perform an operation to convert a voltage of the battery 510 (e.g., 3.4 V~4.4 V) to a voltage suited for a voltage of the OTG device and the wireless power receiving device when the voltage of first power from the battery 510 is boosted to the voltage of the second power.

Further, the control logic 560 may control all of a 1-1 switch Q1, a 1-2 switch Q2, a 2-1 switch Q3, and a 2-1 switch Q4 to be on-state to thus distribute the second power to third power and fourth power, and the third power and fourth power are transmitted to the OTG device and the wireless power receiving device respectively. According to an embodiment of the present disclosure, when the third power and fourth power are outputted, the control logic 560 may control the power output to be available only below a predetermined threshold of the power output to prevent over-discharging of the battery 510.

According to an embodiment of the present disclosure, a method of operating an electronic device may comprise determining whether the electronic device is connected with a wireless power receiving device and a wired power receiving device, when the wireless power receiving device and the wired power receiving device are connected, electrically connecting a battery with a conductive pattern to wirelessly transmit power to the wirelessly power receiving device, by the electronic device, and while simultaneously transmitting wirelessly power to an outside, electrically connecting the battery with a connector to wiredly transmit power to the wired power receiving device, by the electronic device.

According to an embodiment of the present disclosure, the electronic device may comprise a display exposed through a surface of a housing, a battery mounted in the housing, a circuit electrically connected with the battery, a conductive pattern positioned in the housing, and electrically connected with the circuit, and wirelessly transmit power to an outside of the electronic device, a connector configured to be exposed through another surface of the housing, and electrically connected with the circuit, a processor configured to be electrically connected with a memory, the display, the battery, the circuit, the connector, or the memory. The circuit is configured to electrically connect the battery with the conductive pattern, wirelessly transmit power to the outside, and electrically connect the battery with the connector to wiredly transmit power to the outside simultaneously or selectively with wirelessly transmitting power to the outside.

According to an embodiment of the present disclosure, the method of operating the electronic device may further comprise, by the electronic device, changing a first voltage generated by the battery into a second voltage higher than the first voltage, transmitting a portion of a current generated by the second voltage to the conductive pattern, and transmitting another portion of the current generated by the second voltage to the connector.

According to an embodiment of the present disclosure, the method of operating the electronic device may further comprise, by the electronic device, charging another battery included in an external device to a voltage level selected from a plurality of voltage levels.

According to an embodiment of the present disclosure, the method of operating the electronic device may further comprise, by the electronic device, receiving information on charging from the external device and select the selected voltage level from the plurality of voltage levels based on the received information.

According to an embodiment of the present disclosure, the method of operating the electronic device may further comprise wirelessly or wiredly transmitting the power to the outside based on a user input.

According to an embodiment of the present disclosure, the method of operating the electronic device may further comprise displaying information related to an external device on the display based on a signal received from the external device through the connector.

According to an embodiment of the present disclosure, the method of operating the electronic device may further comprise receiving power from an external wireless power supply device to charge the battery, and simultaneously performing an OTG function when the electronic device is connected with the external wireless power supply device and an OTG device.

According to an embodiment of the present disclosure, the method of operating the electronic device may further comprise, by the electronic device, receiving power from a wired power supply device to charge the battery and simultaneously supplying power to a wireless power receiving device when the electronic device is connected with the wired power supply device and the wireless power receiving device.

According to an embodiment of the present disclosure, the method of operating the electronic device may further comprise, by the electronic device, supplying power to an external wireless power receiving device using the battery, and simultaneously performing an OTG function, when the electronic device is connected with the external wireless power supply device and an OTG device.

According to an embodiment of the present disclosure, the method of operating the electronic device may further comprise displaying, by the electronic device, a user interface configured to control at least a portion of the circuit on the display.

According to an embodiment of the present disclosure, the method of operating the electronic device may further comprise receiving, through the display by the electronic device, a user input for wirelessly or wiredly transmitting power from the battery to an external device through the display, or wiredly or wirelessly receiving power from the external device.

According to an embodiment of the present disclosure, the method of operating the electronic device may further comprise displaying, on the display by the electronic device, at least one of at least one or more external devices connected to the electronic device and remaining battery power of the connected external device.

Figure 6:
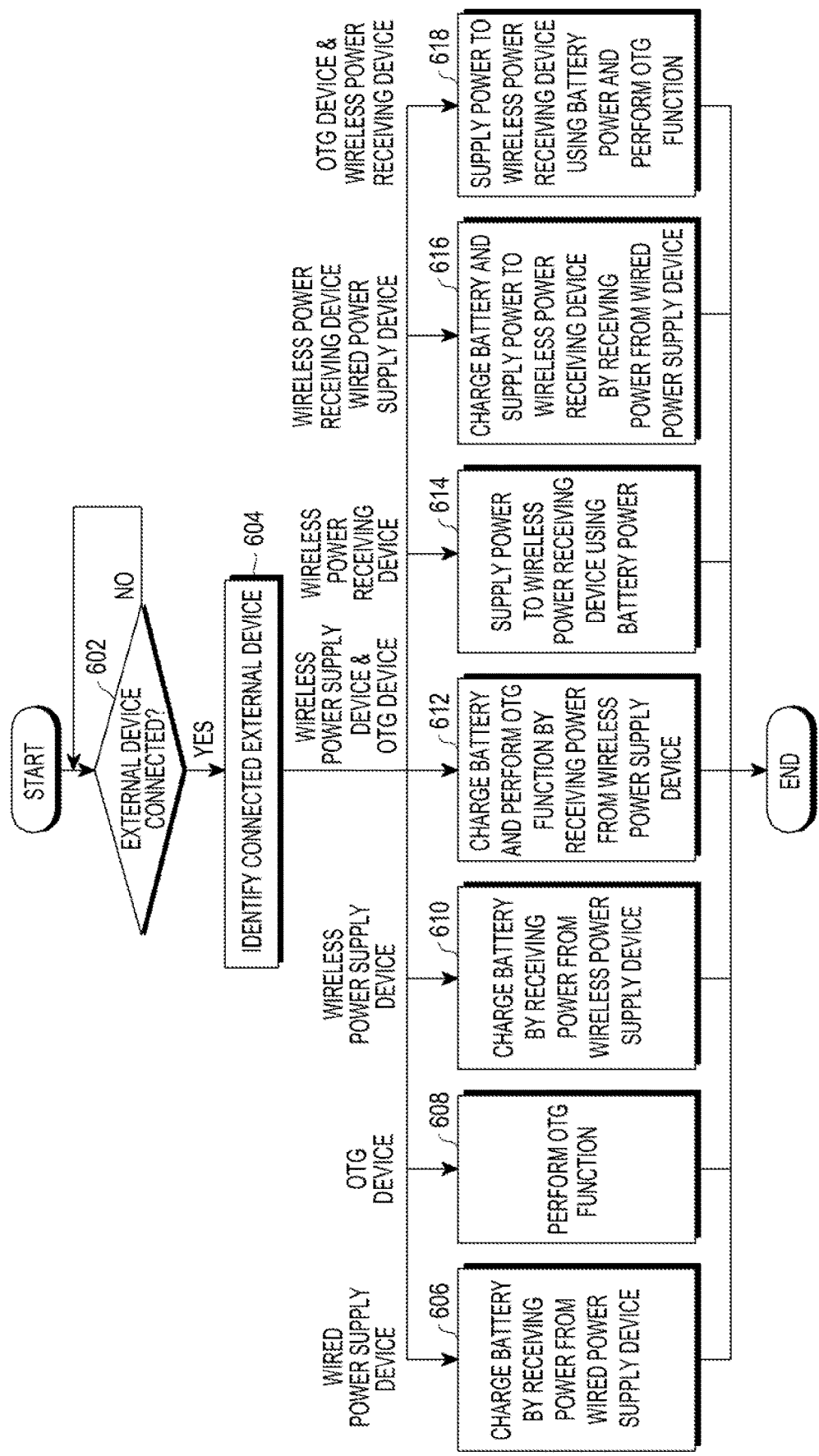
FIG. 6 is a view illustrating a control operation of a charging circuit of an electronic device according to an embodiment of the present disclosure.

FIG. 6 is a view illustrating a control operation of a charging circuit according to an embodiment of the present disclosure.

Referring to FIG. 6, an electronic device may determine whether an external device is connected in operation 602. The electronic device may determine the connected external device in operation 604. For example, the electronic device may determine whether the external device connected to the electronic device is a wired power supply device, a wired power receiving device, an OTG device, a wireless power supply device, or a wireless power receiving device.

The electronic device may control a battery 510 to be charged using received power from the wired power supply device in operation 606 when the wired power supply device is connected.

The electronic device may control an OTG function to be performed in operation 608 when the OTG device is connected.

The electronic device may control the battery 510 to be charged using received power from the wireless power supply device in operation 610 when the wireless power supply device is connected.

When the wireless power supply device and the OTG device are connected, the electronic device may control the OTG function to be performed simultaneously with charging the battery 510 by receiving power from the wireless power supply device in operation 612.

When the wireless power supply device is connected, the electronic device may control power to be supplied to the wireless power supply device using the battery 510 in operation 614.

When the wired power supply device and the wireless power receiving device are connected, the electronic device may control power to be supplied to the wireless power receiving device simultaneously with charging the battery 510 by receiving power from the wired power supply device in operation 616.

When the wireless power receiving device and the OTG device are connected, the electronic device may control power to be supplied to the wireless power receiving device simultaneously performing the OTG function using the power of the battery 510 in operation 618.

Figure 7:
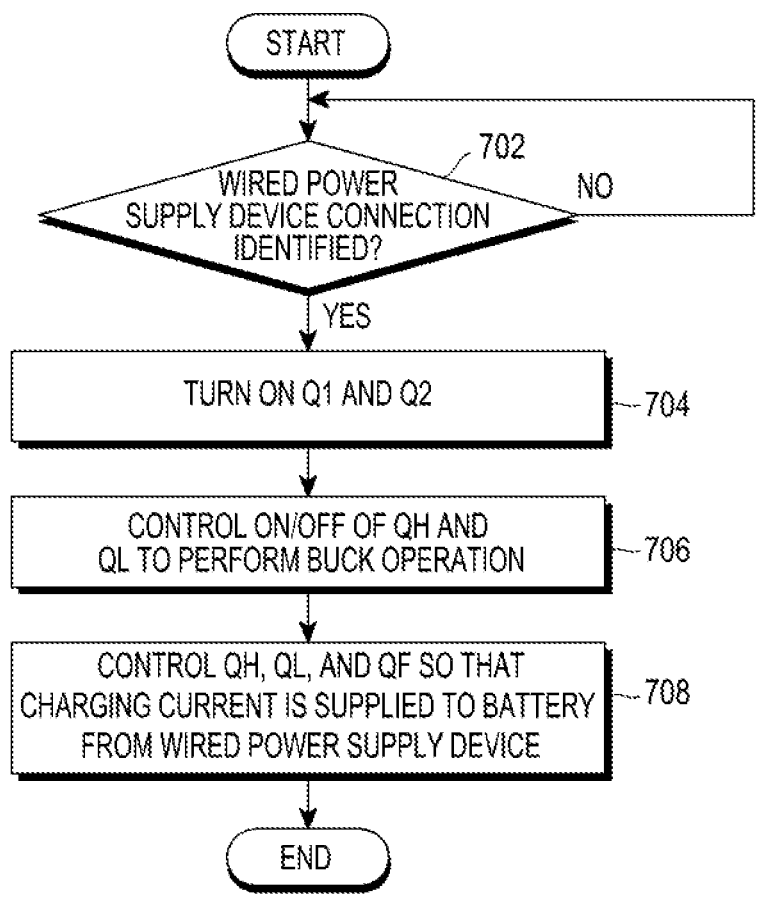
FIG. 7 is a view illustrating an operation of an electronic device when a wired power supply device is connected according to an embodiment of the present disclosure.

FIG. 7 is a view illustrating an operation of an electronic device when a wired power supply device is connected, according to an embodiment of the present disclosure.

Referring to FIG. 7, the electronic device may determine whether the wired power supply device is connected in an operation 702. According to an embodiment of the present disclosure, the electronic device may determine whether an external device connected through an interface controller 529 is the wired power supply device, and may determine whether the connected external device supports quick charging. When the electronic device supports the quick charging, the electronic device may change a current or voltage of transmitting power from the wired power supply device depending upon a situation by communicating with the wired power supply device. For example, the electronic device may enable the current and voltage of transmitting power from the wired power supply device to be changed into a most efficient voltage and current among a 5 V and 2 A, a 9 V and 1.67 A, and a 12 V and 1.25 A by communicating with the wired power supply device. According to an embodiment of the present disclosure, a predetermined protocol may be used for the communication between the electronic device and the wired power supply device. For example, a predetermined protocol may be a protocol using D+ and D− pins of the wired interface. The predetermined protocol may be a protocol of a packet method. According to an embodiment of the present disclosure, the wired power supply device may start power transmission basically with 5 V. The 5 V may be set to be changed into an appropriate charging voltage (e.g., the most efficient quick charging voltage among 5 V, 9 V, and 12 V) by means of communication using D+ and D− pins between an internal control IC of the wired power supply device and an internal control IC of the electronic device. Here, the charging voltage may not be limited to the aforementioned embodiment. Upon completing a configuration of the charging voltage, an input current limit value corresponding to the charging voltage may be set to protect the wired power supply device when the internal over current protection (OCP) IC is damaged. Here, the wired power supply device may firstly control a voltage and current supplied for charging to the electrical device depending on the input current limit value corresponding to the charging voltage, and secondly control a voltage and current provided for charging through the communication with the electronic device.

The electronic device may turn on a 1-1 switch Q1 and a 1-2 switch Q2, thereby making it possible to receive power from the wired power supply device, in operation 704.

The electronic device turns on the 1-1 switch Q1 and the 1-2 switch Q2, and then may control an on/off operation of a QH switch and a QL switch, so that the switch group 562 performs a buck operation in operation 706. The switch group 562 may perform the on/off operation of the QH switch and the QL switch, respectively, according to the buck operation, and may buck the charging voltage from the wired power supply device to provide a constant charging current to the battery 510.

For example, the switch group 562 may perform a buck converter operation in which the charging current is fixed as a predetermined value (e.g., 3 A) and charged in a range where the voltage of a CC range (the battery 510) increases to a predetermined range (e.g., 3.4 V~4.4 V). Specifically, the switch group 562 may supply 9 W (9 W=3 V*3 A) of power from the wired power supply device to the battery 510 when the voltage of battery 510 is 3 V, and supply 12 W (12 W=4 V*3 A) of power from the wired power supply device to the battery 510 when the voltage of battery 510 is 4 V, such that a charging current from the wired power supply device is uniformly supplied to the battery 510.

The electronic device may control the QH switch and the QL switch of the switch group 562 and the QF switch of a charging switch 564 to supply the charging current from the wired power supply device to the battery 510 in operation 708. For example, the electronic device may operate the QF switch so as to supply a bucked charging current to the battery according to the on/off operation of the QH switch and the QL switch.

Figure 8:
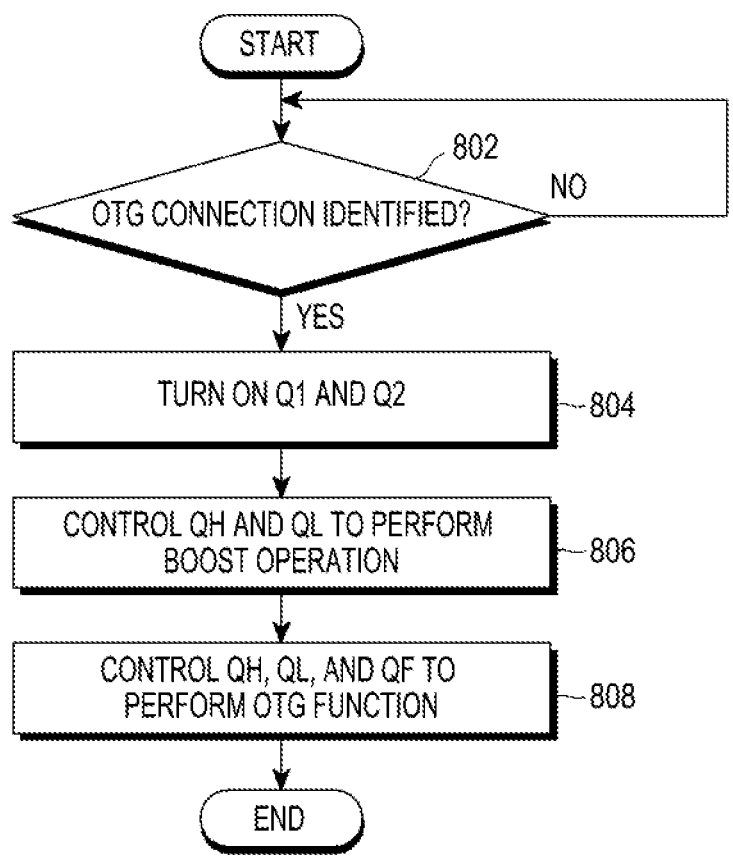
FIG. 8 is a view illustrating an operation of an electronic device when an on-the-go (OTG) is connected according to an embodiment of the present disclosure.

FIG. 8 is a view illustrating an operation of an electronic device when an OTG is connected according to an embodiment of the present disclosure.

Referring to FIG. 8, an electronic device may determine whether the OTG device is connected in operation 802. According to an embodiment of the present disclosure, when the electronic device is connected to an OTG pin of a wired interface 421, the electronic device may determine that the OTG device 403 is connected thereto through an interface controller 529.

Upon determining that the OTG device 403 is connected, the electronic device may turn on a 1-1 switch Q1 and a 1-2 switch Q2, thereby making it possible to transmit power to the OTG device, in operation 804.

The electronic device turns on the 1-1 switch Q1 and the 1-2 switch Q2, and then may control an on/off operation of a QH switch and a QL switch so that the switch group 562 performs a boost operation in operation 806. The switch group 562 may perform the on/off operation of the QH switch and the QL switch, respectively, according to the boost operation, and may boost a voltage from the battery 510 to provide a CC to the OTG device. For example, the switch group 562 may perform an operation to convert a voltage of the battery 510 (e.g., 3.4 V~4.4 V) to a voltage suited for a voltage of the OTG device (e.g. 5 V).

The electronic device may control the QH switch and the QL switch of the switch group 562 and the QF switch of a charging switch 564 to supply power from the battery 510 to the OTG device, enabling the OTG function to be performed, in operation 808. For example, the electronic device may operate the QF switch so that the voltage from the battery 501 is delivered to the QH switch and the QL switch to be boosted.

Figure 9:
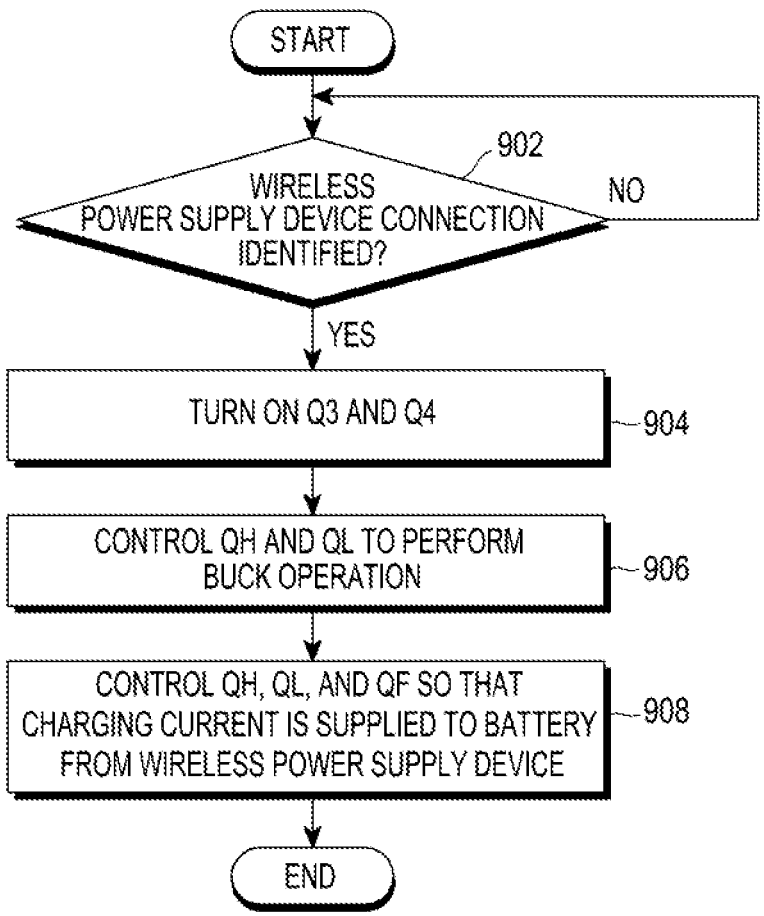
FIG. 9 is a view illustrating an operation of an electronic device when a wireless power supply device is connected according to an embodiment of the present disclosure.

FIG. 9 is a view illustrating an operation of an electronic device when a wireless power supply device is connected according to an embodiment of the present disclosure.

Referring to FIG. 9, the electronic device may determine whether the wireless power supply device is connected in operation 902. According to an embodiment of the present disclosure. The electronic device may determine that the wireless power supply device is connected when power reception is detected at a TRX IC through a conductive pattern of the wireless interface.

Upon confirming that the wireless powers supply is connected, the electronic device may turn on a 2-1 switch Q3 and a 2-2 switch Q4, thereby making it possible to receive power from the wireless power supply device, in operation 904.

The electronic device turns on a 2-1 switch Q3 and a 2-2 switch Q4, and then may control an on/off operation of a QH switch and a QL switch so that the switch group 562 performs a buck operation in operation 906. The switch group 562 may perform the on/off operation of the QH switch and the QL switch, respectively, according to the buck operation and may buck a charging voltage from the wired power supply device to provide a constant charging current to the battery 510.

According to an embodiment of the present disclosure, when a charging voltage from the wireless power supply device is bucked, the switch group 562 may perform a buck converter operation in which the charging current may be fixed as a predetermined current level (e.g., 3 A) and charged in a CC range that the voltage of the battery 510 increases to a predetermined range (e.g., 3.4 V~4.4 V). Specifically, the switch group 562 may supply 9 W (9 W=3 V*3 A) of power from the wired power supply device to the battery 510 when the voltage of battery 510 is 3 V, and supply 12 W (12 W=4 V*3 A) of power from the wired power supply device to the battery 510 when the voltage of battery 510 is 4 V, such that a charging current from the wired power supply device is uniformly supplied to the battery 510. Further, the switch group 562 may enter the CV range, fix a charging voltage with a buffer voltage, and gradually reduce the current so as to perform charging, because charging is unnecessary when the voltage of the battery 510 reaches a buffer voltage (e.g., 4.4 V). Here, the switch group 562 may perform an operation to convert a voltage inputted from the wireless power supply device into a voltage suited for the battery 510.

The electronic device may control the QH switch and the QL switch and the QF switch of a charging switch 564 to supply the charging current from the wireless power supply device to the battery 510 in operation 908. For example, the electronic device may operate the QF switch so as to supply a bucked charging current to the battery according to the on/off operation of the QH switch and the QL switch.

Figure 10:
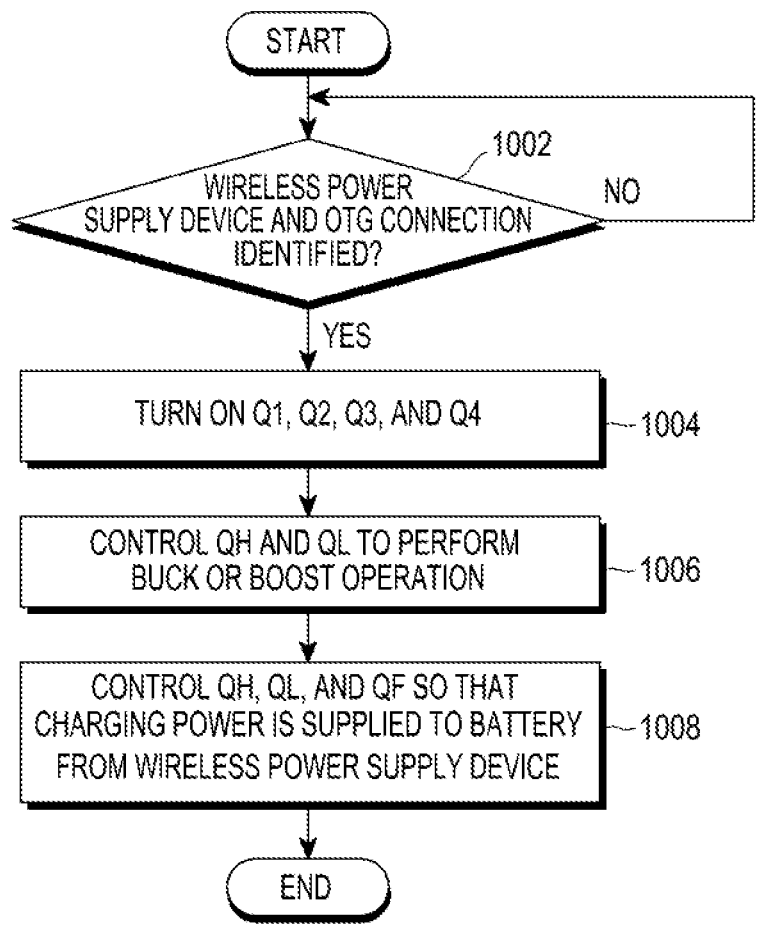
FIG. 10 is a view illustrating an operation of an electronic device when a wireless power supply device and an OTG device are connected according to an embodiment of the present disclosure.

FIG. 10 is a view illustrating an operation of an electronic device when a wireless power supply device and an OTG device are connected according to an embodiment of the present disclosure.

Referring to FIG. 10, an electronic device may determine whether a wireless power supply device and an OTG device are connected in operation 1002. The wireless power supply device may be connected through a wireless interface 525 and the OTG device are connected through a wired interface 521. According to an embodiment of the present disclosure, the electronic device may determine that the wireless power supply device is connected when a TRX IC operates through a conductive pattern of the wireless interface. Further, when the electronic device is connected to an OTG pin of the wireless interface, the electronic device may determine that the OTG device is connected.

Upon confirming that the wireless power supply device and the OTG device are connected to the electronic device, the electronic device may turn on a 1-1 switch Q1, a 1-2 switch Q2, and a 2-1 switch Q3 a 2-2 switch Q4, making it possible to receive power from the wireless power supply device and an input/output by the OTG device in operation 1004.

The electronic device turns on the 1-1 switch Q1, the 1-2 switch Q2, and the 2-1 switch Q3 and the 2-2 switch Q4, and then may control an on/off operation of a QH switch and a QL switch, so that the switch group 562 performs a buck or boost in operation 1006. The switch group 562 may perform the on/off operation of the QH switch and the QL switch, respectively, according to the buck operation and may buck a charging voltage from the wireless power supply device to provide a constant charging current to the battery 510. Further, the switch group 562 may perform the on/off operation of the QH switch and the QL switch, respectively, according to the boost operation to provide a constant current (CC) to the OTG device. According to an embodiment of the present disclosure, the switch group 562 may perform an operation to convert a voltage of the battery 510 (e.g., 3.4 V~4.4 V) to a voltage suited for the OTG device (e.g., 5 V) when the voltage of power from the battery 510 is boosted. According to an embodiment of the present disclosure, when the charging voltage from the wireless power supply device is bucked, the switch group 562 may perform the buck converter operation in which the charging current may be fixed as a predetermined current level (e.g., 3 A) and charged in a CC range where the voltage of the battery 510 increases to a predetermined range (e.g., 3.4 V~4.4 V) range. Specifically, the switch group 562 may supply 9 W (9 W=3 V*3 A) of power from the wireless power supply device to the battery 510 when the voltage of battery 510 is 3 V, and supply 12 W (12 W=4 V*3 A) of power from the wireless power supply device to the battery 510 when the voltage of battery 510 is 4 V, such that a charging current from the wireless power supply device is uniformly supplied to the battery 510. Further, the switch group 562 may enter the CV range, fix a charging voltage with a buffer voltage, and gradually reduce the current so as to perform charging, because charging is unnecessary when the voltage of the battery 510 reaches a buffer voltage (e.g., 4.4 V). Here, the switch group 562 may perform an operation to convert a voltage inputted from the wireless power supply device into a voltage suited for the battery 510.

The electronic device may control an on/off operation of the QH switch and the QL switch and the QF switch of the charging switch 564 so that the switch group 562 performs a buck operation to provide power from the battery 510 to the OTG device, thereby performing the OTG function simultaneously with providing charging current from the wireless power supply device to the battery 510 in operation 1008. For example, the electronic device may operate the QF switch to provide a bucked charging current to the battery according to the on/off operation of the QH switch and the QL switch, or may operate the QF switch to supply power to the QH switch and the QL switch, thereby performing an operation to convert an output voltage from the battery 510 into a voltage suited for OTG device According to an embodiment of the present disclosure, the OTG device may be connected through the wired interface 521 while receiving the charging power from the wireless power supply device through the wireless interface 525, or the wireless power supply device may be connected while transmitting the charging power to the OTG device. According to an embodiment of the present disclosure, when the charging power received from the wireless power supply device through the wireless interface 525 is bigger than the charging power transmitted to the OTG device through the wired interface 521, the electronic device may supply the charging current to the OTG device using the received charging current, and input a remaining current to the battery 510 to charge the battery 510. Further, when the charging power received from the wireless power supply device through the wireless interface 525 is smaller than the charging power transmitted to the OTG device through the wired interface 521, the electronic device may supply power to the OTC device using the received charging current, and supplement insufficient power to the OTG device using the charging current from the battery 510.

Figure 11:
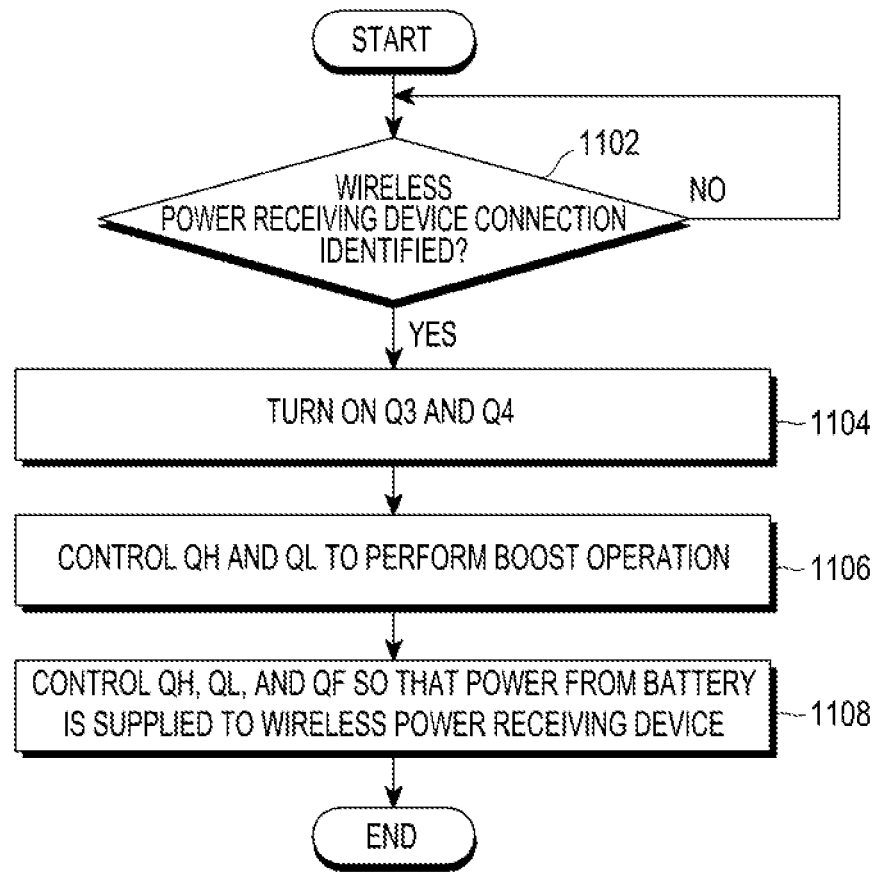
FIG. 11 is a view illustrating an operation of an electronic device when a wireless power receiving device is connected according to an embodiment of the present disclosure.

FIG. 11 is a view illustrating an operation of an electronic device when a wireless power receiving device is connected according to an embodiment of the present disclosure.

Referring to FIG. 11, the electronic device may determine whether the wireless power receiving device is connected in operation 1102. The electronic device may determine that the wireless power receiving device is connected when a TRX IC operates through a conductive pattern of the wireless interface according to a reception of wireless power request signal.

Upon confirming that the wireless powers supply is connected, the electronic device may turn on a 2-1 switch Q3 and a 2-2 switch Q4, thereby making it possible to receive power from the wireless power supply device, in operation 904.

The electronic device turns on the 2-1 switch Q3 and the 2-2 switch Q4, and then may control an on/off operation of a QH switch and a QL switch so that the switch group 562 performs a boost operation in operation 1106. The switch group 562 may perform the ON/OFF operation of the QH switch and the QL switch, respectively, according to the boost operation, and may boost the voltage from the battery 510 to provide a constant charging current to the wireless power receiving device. According to an embodiment of the present disclosure, when the power of battery 510 is supplied to the wireless power receiving device, the switch group 562 may perform an operation to convert a voltage (e.g., 3.4 V~4.4 V) of the battery 510 to a voltage suited for a voltage of the wireless power receiving device.

The electronic device may control the QH switch and the QL switch and a QF switch of a charging switch 564 to supply the power from the battery 510 to the wireless power receiving device in operation 1108. For example, the electronic device may operate the QF switch to supply the power to the QH switch and the QL switch to perform an operation that an output voltage from the battery 510 is changed suited for the voltage of the wireless power receiving device FIG. 12 is a view illustrating an operation of an electronic device when a wired power supply and a wireless power receiving device are connected according to an embodiment of the present disclosure.

Figure 12:
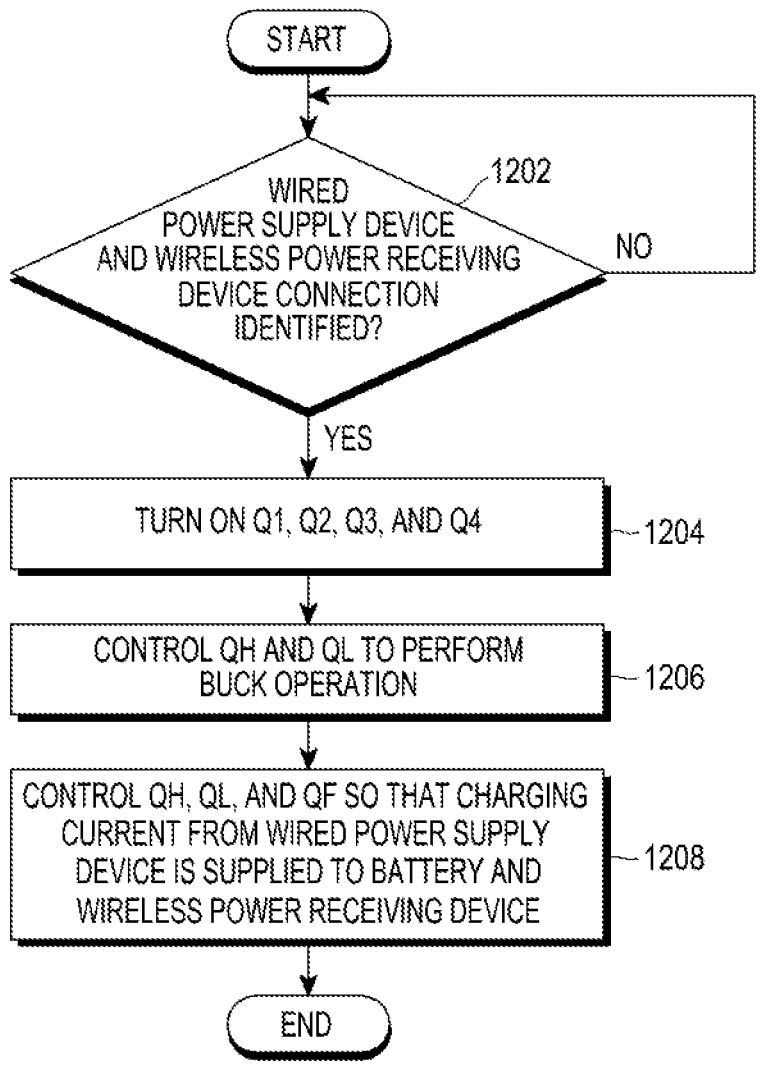
FIG. 12 is a view illustrating an operation of an electronic device when a wired power supply and a wireless power receiving device are connected according to an embodiment of the present disclosure.

Referring to FIG. 12, the electronic device may determine whether the wired power supply device and the wireless power receiving device are connected in operation 1202. The wireless power receiving device may be connected through a wireless interface 525, the wired power supply device may be connected through a wired interface 521.

Upon determining that the wired power supply device and the wireless power receiving device are connected, the electronic device may turn on a 2-1 switch Q3 and a 2-2 switch Q4, thereby making it possible to receive power from the wired power supply device and a power supply to the wireless power receiving device is available in operation 1204.

The electronic device turns on the 1-1 switch Q1, the 1-2 switch Q2, and the 2-1 switch Q3 and the 2-2 switch Q4, and then may control an on/off operation of a QH switch and a QL switch so that the switch group 562 performs a buck operation in operation 1206. The switch group 562 may perform the on/off operation of the QH switch and the QL switch, respectively, according to the buck operation, and may buck a charging voltage from the wired power supply device to provide a constant charging current to the battery 510. According to an embodiment of the present disclosure, when the charging voltage from the wired power supply device is bucked, the switch group 562 may perform a buck converter operation in which the charging current is fixed as a predetermined current level (e.g., 3 A) and charged in a range where the voltage of a CC range (the battery 510) increases to a predetermined range (e.g., 3.4 V~4.4 V). Specifically, the switch group 562 may supply 9 W (9 W=3 V*3 A) of power from the wired power supply device to the battery 510 when the voltage of battery 510 is 3 V, and supply 12 W (12 W=4 V*3 A) of power from the wired power supply device to the battery 510 when the voltage of battery 510 is 4 V, such that a charging current from the wired power supply device is uniformly supplied to the battery 510. Further, the switch group 562 may enter the CV range, fix a charging voltage with a buffer voltage, and gradually reduce the current so as to perform charging, because charging is unnecessary when the voltage of the battery 510 reaches a buffer voltage (e.g., 4.4 V). Here, the switch group 562 may perform an operation to convert a voltage inputted from the wired power supply device into a voltage suited for the battery 510. According to an embodiment of the present disclosure, the switch group 562 may perform an operation to convert a voltage of the battery 510 (e.g., 3.4 V~4.4 V) to a voltage suited for the wireless power receiving device when a first power level from the battery 510 is boosted to a second power level.

The electronic device may control the QH the switch, the QL switch, and the QF switch of the charging switch 564 to provide the charging current from the wired power supply device to the battery 501 and simultaneously to the wireless power receiving device at in operation 1208.

For example, the electronic device may operate the QF switch to provide a bucked charging current corresponding to a bucked voltage to the battery according to the ON/OFF operation of the QH switch and the QL switch, or may control the QH switch and the QL switch and the QF switch of the charging switch 564 to provide the charging current from the wired power supply device to the wireless power receiving device.

According to an embodiment of the present disclosure, when the electronic device supplies the charging current to the wireless power receiving device while receiving a current from the wired power supply device, the electronic device may control an on/off operation of a 2-1 switch Q3, a 2-2 switch Q4, a QH switch and a QL switch to charge the battery 510 using a remaining current after supplying the charging current to the wireless power receiving device using the charging current received from the wired power supply device. When the charging current received from the wired power supply device is a HV (e.g. more than 5 V) and the wireless power receiving device does not receive the HV, the electronic device changes the charging voltage received from the wired power supply device into a 5 V and provides power to the battery 510 using the changed charging voltage. The electronic device may control an on/off operation of the 2-1 switch Q3, the 2-2 switch Q4, the QH switch and the QL switch, such that a remaining power is charged to the battery 510.

Figure 13:
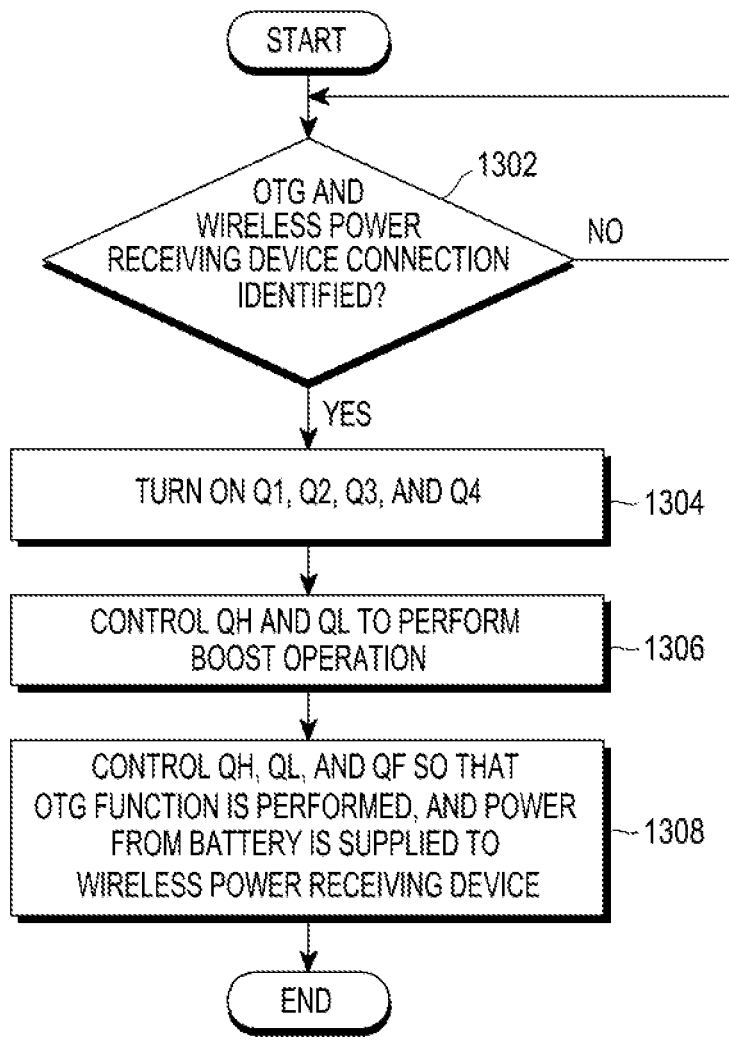
FIG. 13 is a view illustrating an operation of an electronic device when an OTG device and a wireless power receiving device are connected according to an embodiment of the present disclosure.

FIG. 13 is a view illustrating an operation of an electronic device when an OTG device and a wireless power receiving device are connected according to an embodiment of the present disclosure.

Referring to FIG. 13, the electronic device may identify whether the OTG device and the wireless power receiving device is connected in operation 1302. The wireless power receiving device may be connected through a wireless interface 525, and the OTG device may be connected through a wired interface 521.

The electronic device may enable a 1-1 switch Q1, a 1-2 switch Q2, 2-1 switch Q3, and 2-2 switch Q4 to be on-state when the connection of the OTG device is identified so that power supplies to the OTG device and the wireless power receiving device may be possible in operation 1304.

The electronic device turns on the 1-1 switch Q1, the 1-2 switch Q2, the 2-1 switch Q3, and the 2-2 switch Q4, and then the electronic device may control an on/off operation of a QH switch and a QL switch so that the switch group 562 performs a boost operation in operation 1306. The switch group 562 may perform the on/off operation of the QH switch and the QL switch, respectively, according to the boost operation and may boost a voltage from the battery 510 to supply power to the OTG device and the wireless power receiving device. According to an embodiment of the present disclosure, the switch group 562 may perform an operation to convert a voltage of the battery 510 (e.g., 3.4 V~4.4 V) to a voltage suited for OTG device and wireless power receiving device when the voltage of power from the battery 510 is boosted.

The electronic device may control the QH switch, the QL switch and QF switch of charging switch 564 so that a portion of power of the battery is supplied to the OTG device, and simultaneously another portion of power of the battery is supplied to the wireless power receiving device in operation 1308.

Figure 14:
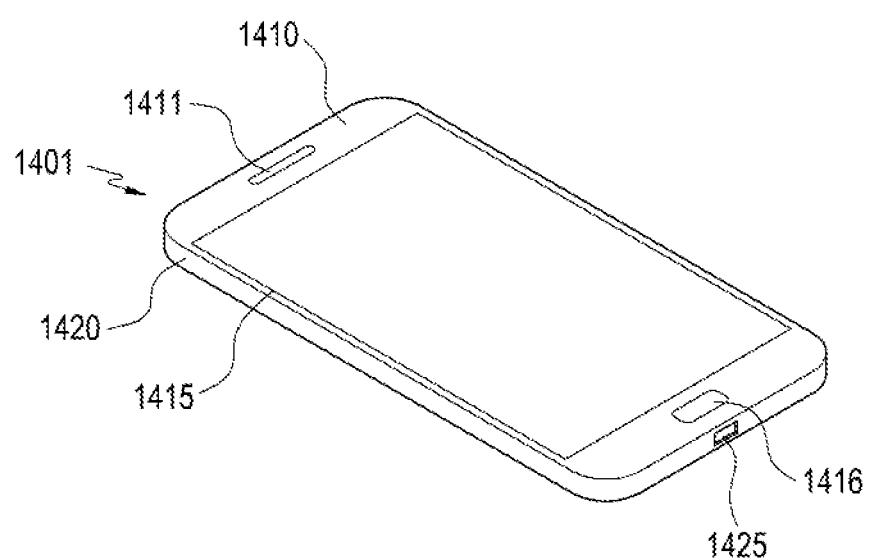
FIG. 14 is an external perspective view illustrating an electronic device according to an embodiment of the present disclosure.

FIG. 14 is an external perspective view illustrating an electronic device according to an embodiment of the present disclosure.

Referring to FIG. 14, a touch screen 1415 may be disposed in a center of the front surface 1410 of the housing of the electronic device 1401. The touch screen 1415 may be formed to be large enough to occupy most of the front surface of the housing. Various screens may be displayed on the touch screen 1415. A home button 1416 may be formed in a lower portion of the touch screen 1415. The home button 1416 may display a main home screen on the touch screen. A speaker 1411 may be placed in an upper portion of the front surface 1410 of the electronic device. A connector 1435 wiredly connectable with the external deceive may be formed in a side of a main body 1420 of the electronic device. According to an embodiment of present disclosure, a conductive pattern may be disposed in various positions with respect to the main body 1420 of the electronic device.

Figure 15:
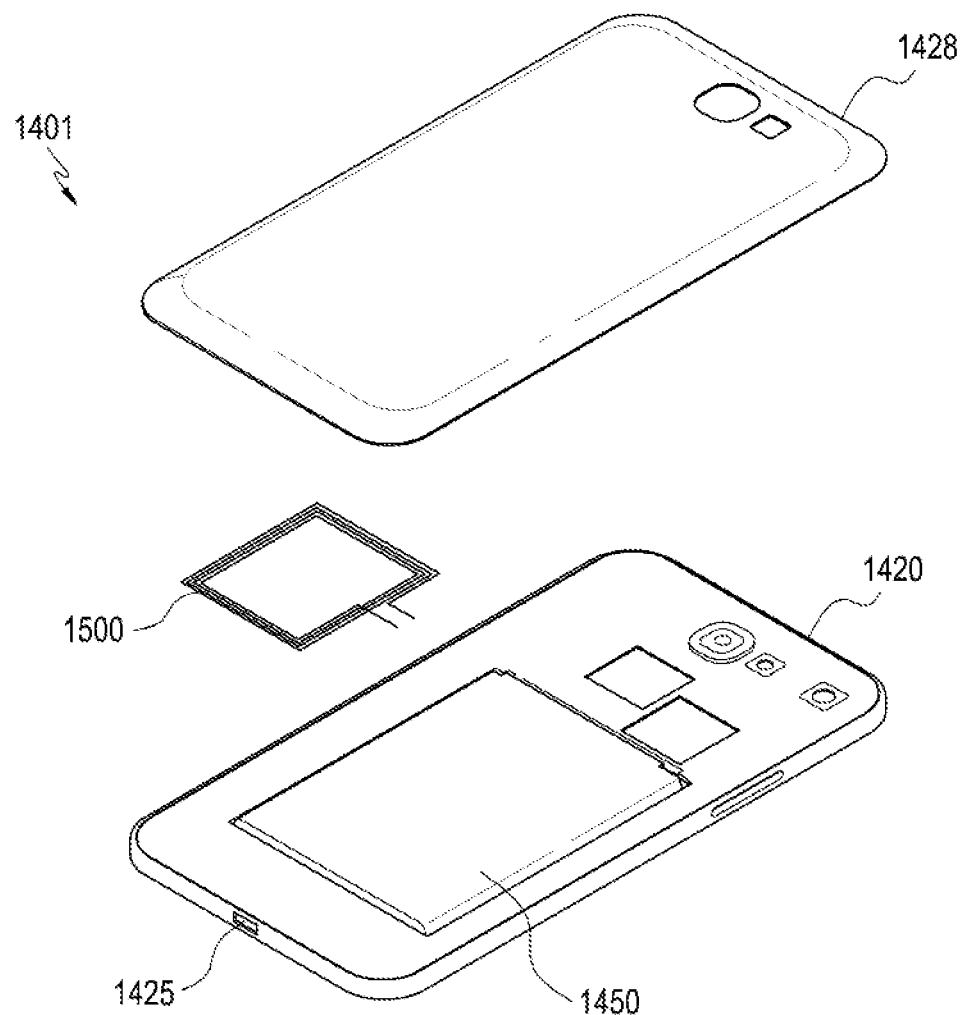
FIG. 15 is a view illustrating a conductive pattern disposed between a main body and a rear cover of an electronic device according to an embodiment of present disclosure.

FIG. 15 is a view illustrating a conductive pattern disposed between a main body and a rear cover of an electronic device according to an embodiment of present disclosure.

Referring to FIG. 15, the electronic device 1401 may include a main body 1420 and a rear cover 1428 detachably disposed in a rear side of the main body 1420, and the conductive pattern 1500 is disposed between the main body 1420 and the rear cover 1428. A battery 1450 may be seated in a rear side of the main body 1420. Together with the battery seated therein, the rear cover 1428 may be combined with the main body 1420 and form the housing. According to an embodiment of present disclosure, the conductive pattern 1500 may be attached to the rear cover 1428 or may have a molded shape inside the rear cover 1428. According to an embodiment of present disclosure, the conductive pattern 1500 may be attached to the battery 1450.

Figure 16:
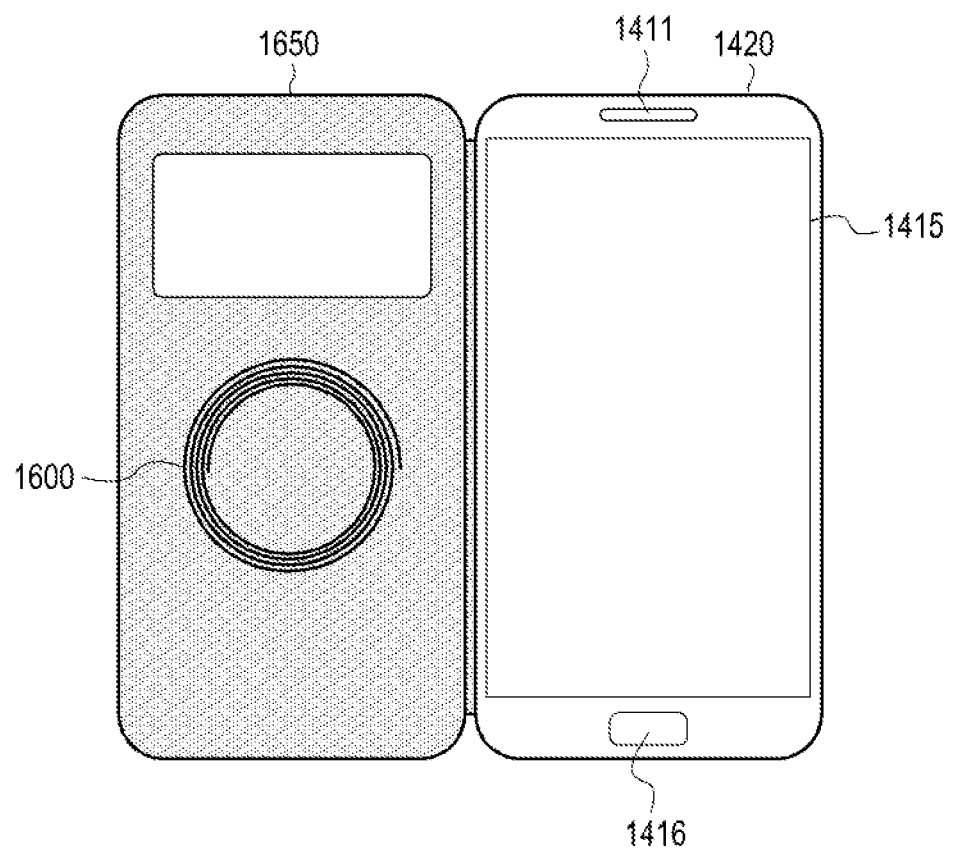
FIG. 16 is a view illustrating a conductive pattern disposed on a front cover of an electronic device according to an embodiment of present disclosure.

FIG. 16 is a view illustrating a conductive pattern disposed in a front cover of an electronic device according to an embodiment of present disclosure.

Referring to FIG. 16, a conductive pattern 1600 may be connected with a main body 1420 and may be disposed in a front cover 1650 protecting the front surface of the main body.

FIGS. 17, 18, 19 and 20 are views illustrating configurations in which an external device is connected to an electronic device according to various embodiments of present disclosure.

Figure 17:
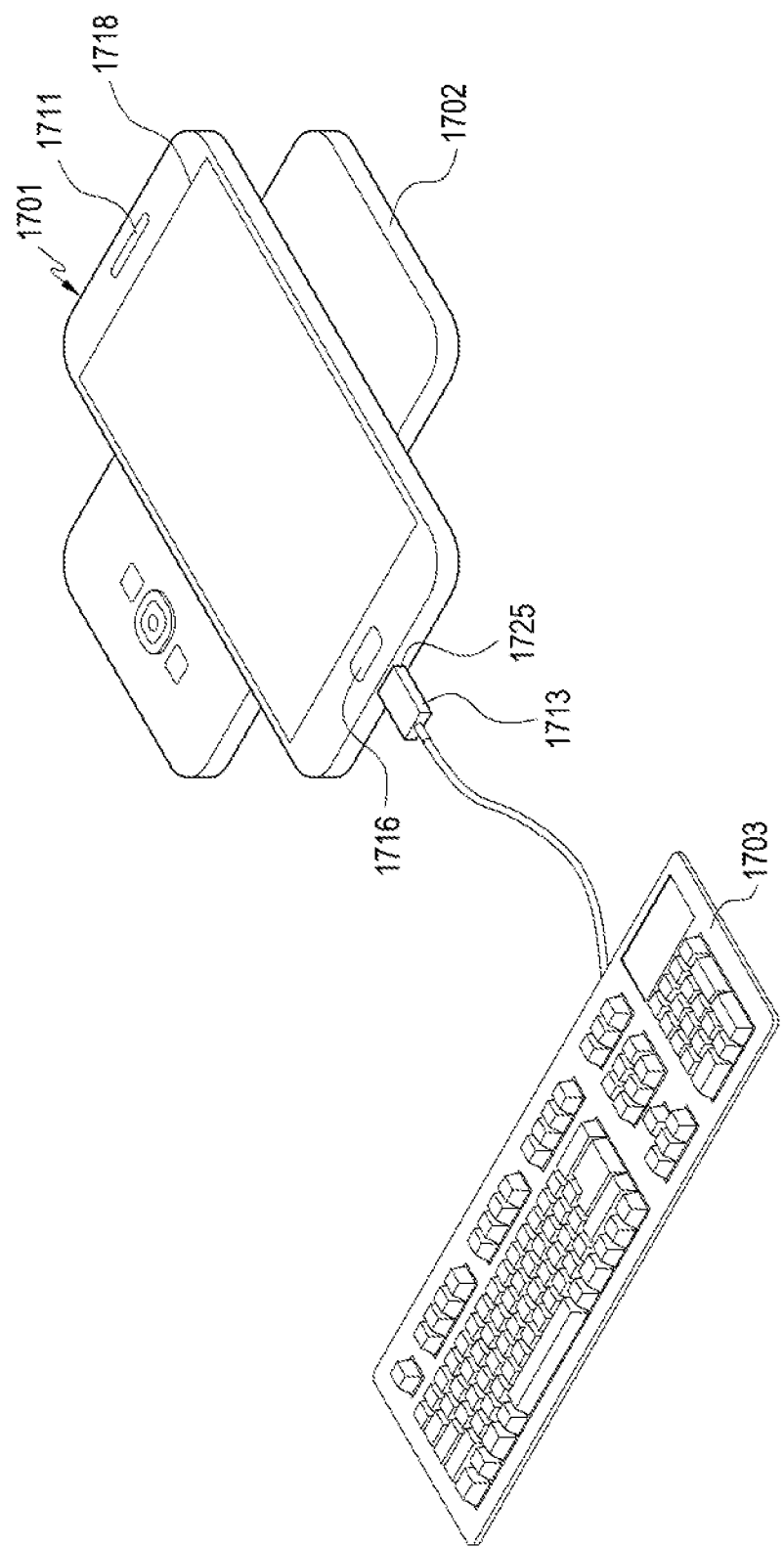
FIGS. 17, 18, 19, and 20 are views illustrating configurations in which an external device is connected to an electronic device according to various embodiments of present disclosure.

Referring to FIG. 17, according to an embodiment of present disclosure, an electronic device 1701 may be a device in which a touch screen 1718 is disposed in a front side of a housing, a home button 1716 is formed in a lower portion thereof, a speaker 1711 is formed in an upper front of the housing, and a connector 1725 wiredly connectable is formed in a surface of a main body. For example, the wiredly connectable connector may be a connector which is connectable using at least one method of USB, HDMI, RS-232, and POTS. The electronic device 1701 may wirelessly transmit or receive power from a first external device 1702 (e.g., a smart phone) through the conductive pattern provided in the housing. The electronic device 1701 may be connected with a second external device 1703 (e.g., a keyboard) using a wired cable 1713 through the connector to perform an OTG function.

Figure 18:
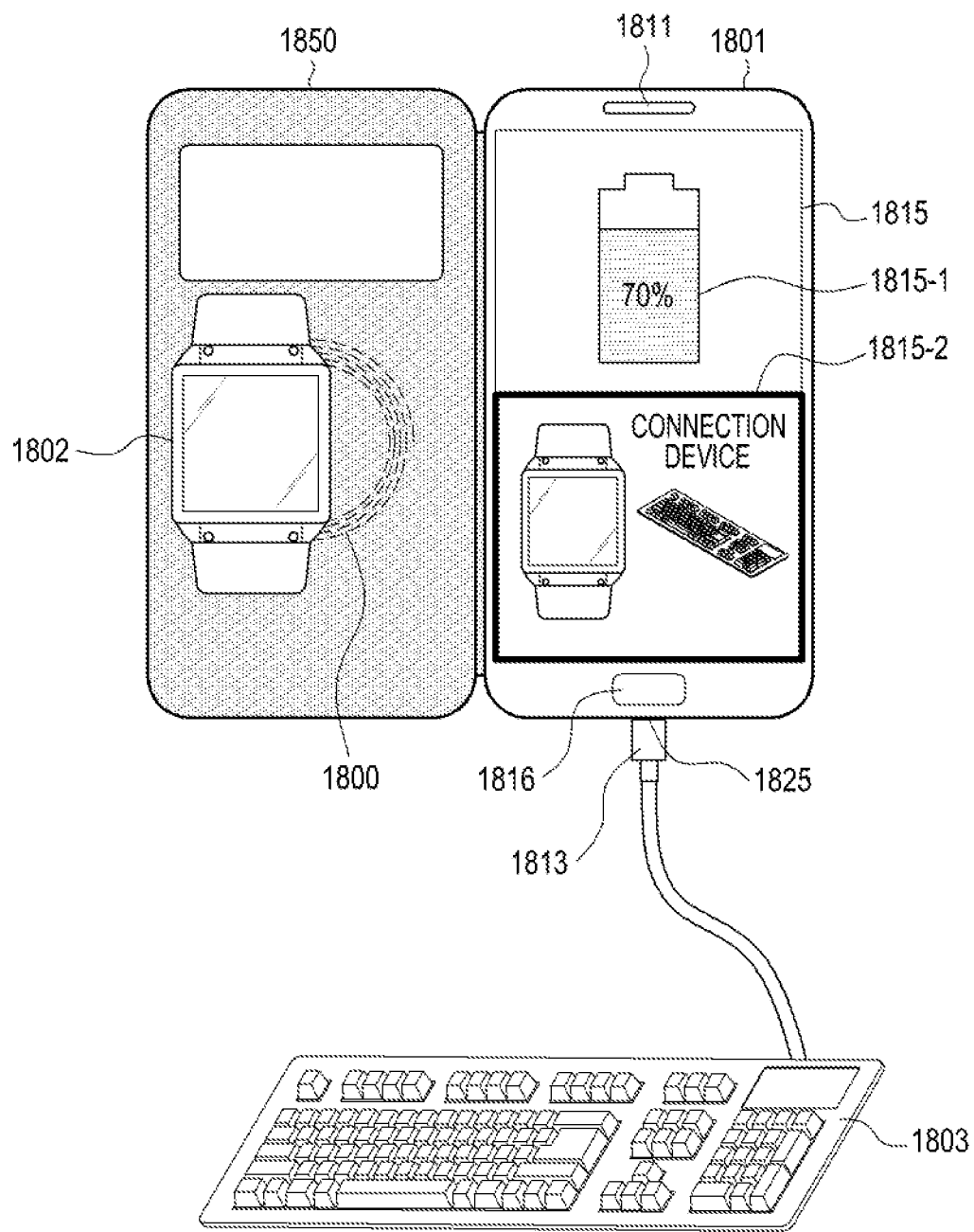

Referring to FIG. 18, according to an embodiment of present disclosure, an electronic device 1801 may be a device including a front cover 1850 protecting the front surface, in which a touch screen 1815 is disposed in the front of housing, a home button 1816 is formed in a lower portion, and a speaker 1811 is configured in the upper front of housing, and a connector 1825 wiredly connectable with an external device is foamed on a surface of a main body. The electronic device 1801 may wirelessly transmit or receive power from a first external device 1802 (e.g., smart phone) through the conductive pattern 1800 provided in a front cover 1850. The electronic device 1801 may be connected with a second external device 1803 (e.g., keyboard) through the wired cable 1813, and may perform an OTG function. Further, the electronic device 1801 may display a content 1815-2 indicating a connection device connected with the electronic device 1801 and a remaining battery power 1815-1 of the electronic device 1801 on at least a portion of touch screen 1815 when the first and second external devices are connected.

Figure 19:
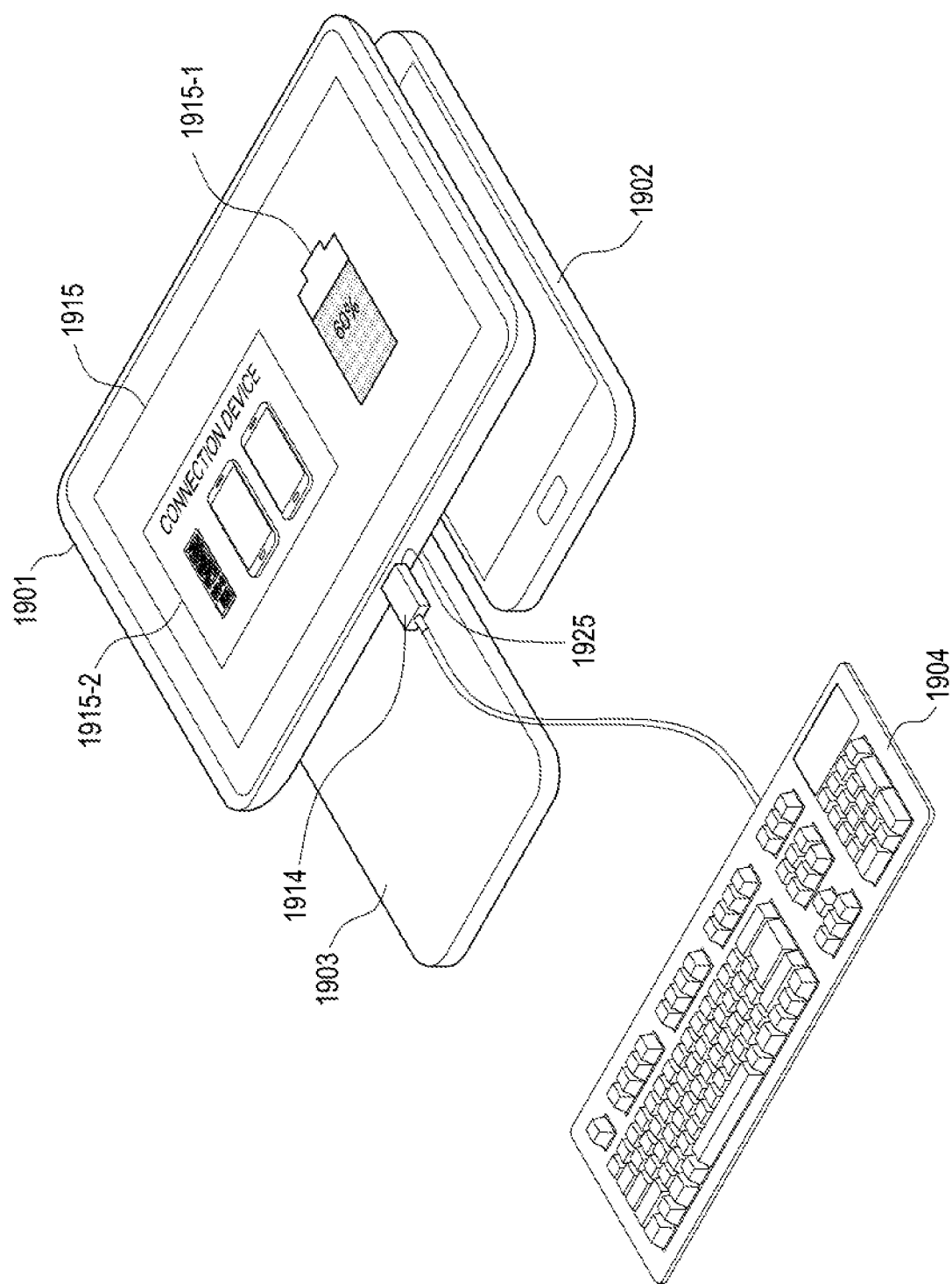

Referring to FIG. 19, according to an embodiment of the present disclosure, an electronic device may be a device (e.g., a smart pad) in which a touch screen 1915 is disposed in the front surface of the housing, and the connector 1925 connectable with an external device is formed in a surface of the main body. The electronic device may be provided with a plurality of conductive patterns (e.g., a first and second conductive patterns) in the housing. For example, the electronic device 1901 may wirelessly transmit power to a first external device 1902 through the first conductive pattern, and may wirelessly receive power from a second external device 1903 through the second conductive pattern. The electronic device 1901 may be connected with a third external device 1904 (e.g., keyboard) through the connector 1925 by a wired cable 1914, and may perform an OTG function. Further, the electronic device 1901 may display, in at least a portion of the touch screen 1915, a content 1915-2 showing a connection device connected to the electronic device 1901 and a remaining battery power 1915-1 of the electronic device 1901.

Figure 20:
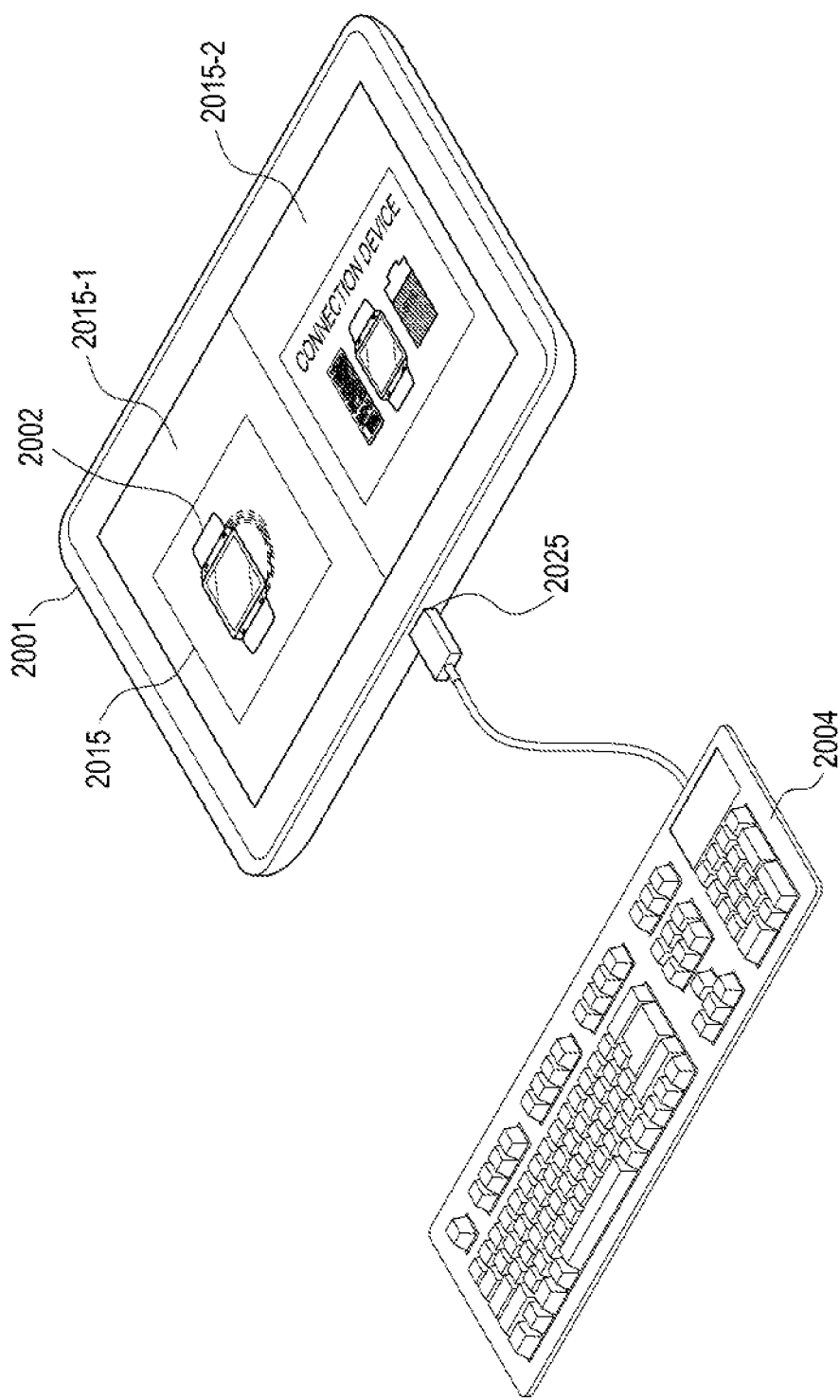

Referring to FIG. 20, according to an embodiment of the present disclosure, an electronic device 2001 may be a device in which a touch screen 2015 providing dual screens including a first screen 2015-1 and a second screen 2015-2 may be disposed in the front surface of the housing, a connector 2025 wiredly connectable with an external device is formed in a surface of a main body, and a conductive pattern may be provided in a position of the housing corresponding to a position of one of the first screen 2015-1 or the second screen 2015-2. The electronic device 2001 may wirelessly transmit power to or receive power from a first external device 2002 (e.g., a smart watch) and may be connected with a second external device 2004 (e.g., a keyboard) through the connector 2025 to perform an OTG function. The electronic device 2001 may display a content displaying at least one of battery states of the electronic device 2001 on an at least one screen (e.g., 2015-2) position of the first screen 2015-1 or the second screen 2015-2.

FIGS. 21A, 21B, 21C, 21D, 21E, 22A, 22B, and 23 are views illustrating a screen displayed on an electronic device according to various embodiments of the present disclosure.

Referring to FIG. 21A, according to an embodiment of present disclosure, when a wired power supply device is connected, an electronic device may display a screen 2110 indicating that the wired power supply device is connected, and power is being wiredly received as illustrated in FIG. 21A. When a wired power receiving device is connected, the electronic device may display a screen 2120 indicating that the wired power receiving device is connected, and power is being wiredly supplied as illustrated in FIG. 21B. When a wireless power supply device is connected, the electronic device may display a screen 2130 indicating that the wireless power supply device is connected, and power is being wirelessly received, as illustrated in FIG. 21C. When a wired power receiving device is connected, the electronic device may display a screen 2140 indicating that the wired power receiving device is connected, and power is being wiredly supplied as illustrated in FIG. 21D. When an OTG device is connected, the electronic device may display a screen 2150 indicating that the OTG device is connected, and an OTG function is performed as illustrated in FIG. 21E.

Referring to FIG. 22A, according to an embodiment of present disclosure, when an OTG device and a wireless power receiving device are connected, an electronic device may display a screen 2210 indicating that the OTG device and the wireless power receiving device are connected, an OTG function is performed, and power is being wirelessly supplied, as illustrated in FIG. 22A. When a wired power supply device and a plurality of wireless power receiving devices are connected, the electronic device may display a screen 2220 indicating that the wired power supply device and the plurality of wireless power receiving devices are connected, power is being wiredly received, and power is being wirelessly supplied as illustrated in FIG. 22B.

Figure 23:
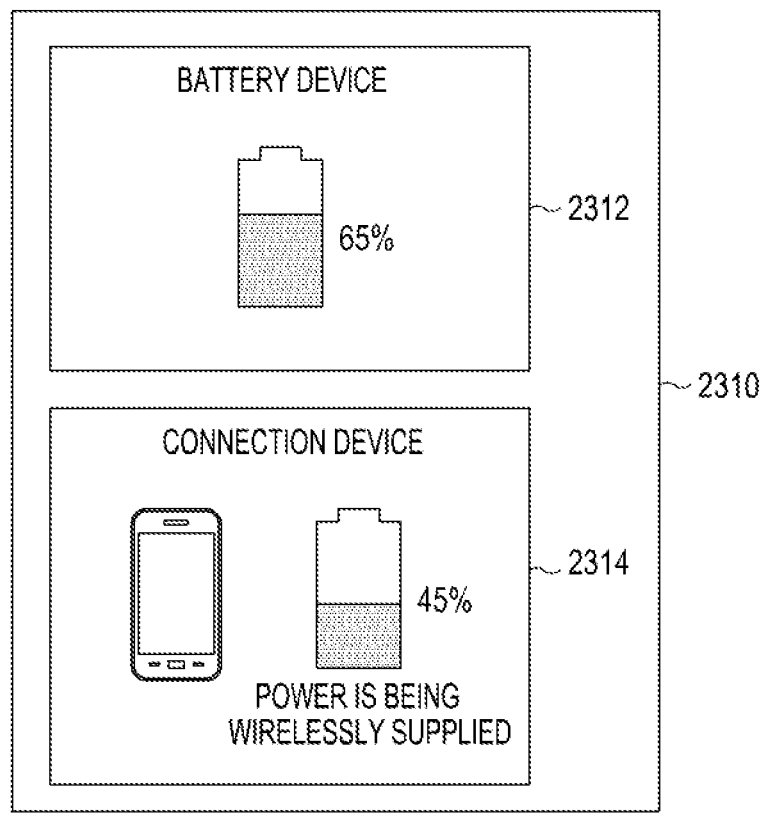

Referring to FIG. 23, according to an embodiment of present disclosure, when an external device is connected, the electronic device may display, on a screen 2310, at least one of contents 2314 including a type of the external device connected with a content 2312 indicating remaining battery power of the electronic device, battery information of the connected external device, and information of whether power is supplied to the connected external device, or information of whether power is received from the connected external device.

Further, according to an embodiment of the present disclosure, when a plurality of external devices is connected, the electronic device may display a content capable of adjusting a distribution of power that can be provided to the connected external devices. For example, when the electronic device supplies power to the respective external devices connected, the electronic device may display a content in which a priority of power supply can be selected and a content capable of adjusting power provided to the respective external devices connected thereto.

According to an embodiment of the present disclosure, when the electronic device is not equipped with a display, or despite the display a user cannot see a content, the electronic device may provide a content to the external device, such that the content is displayed in the external device. For example, when the display of the electronic device is blocked by the external device, the electronic device may provide the content to the external device, thereby displaying the content in the external device.

As described above, according to an embodiment of the present disclosure, the electronic device receive power from a wired power supply device or a wireless power supply device through a charging circuit to charge a battery. Also, the electronic device may supply power from a battery to a wired power supply device or a wireless power supply device. Further, the electronic device may receive power from a wired power supply device through a charging circuit, a portion of which may be used for charging a battery and another portion of which may be supplied to an external wireless power receiving device. Further, the electronic device may perform an OTG function through one charging circuit and simultaneously supply power from a battery to an external wireless device or receive power from the external wireless device to charge a battery. The electronic device may further perform a wireless power supply function through one charging circuit, in addition to a wired charging, an OTG function, and a wireless charging, thereby providing an efficient charging circuit.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as optical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

As is apparent from the foregoing description, according to an embodiment of the present disclosure, an electronic device may receive power from a wired or wireless charging device to charge a battery through a charging circuit. The electronic device may supply power of the battery to a wired or wireless charging device.

According to an embodiment of the present disclosure, an electronic device may receive power through a charging circuit, a portion of which may be used for charging a battery of the electronic device and another portion of which may be supplied to an external wireless power receiving device.

According to an embodiment of the present disclosure, an electronic device may receive power from an external wireless device to charge a battery, or may supply power of a battery to an external wireless device through a charging circuit, while performing an OTG function.

According to an embodiment of the present disclosure, an electronic device may perform a wireless power supply function through a charging circuit, in addition to a wired charging, an OTG function, and a wireless charging, thereby providing an efficient charging circuit.

Modules or programming modules in accordance with various embodiments of the Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Or Furthermore, some of the operations may be performed in a different order, or omitted, or include other additional operation(s).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile computing device for providing cellular communication, components of the mobile computing device comprising:
   a display;
   a battery;
   a camera;
   a conductive pattern disposed between the battery seated in rear side of a main body and a rear cover of the mobile computing device;
   a connector;
   a communication module for communicate with another computing device;
   a power management module electrically connected with the battery for managing power supplied to components of the mobile computing device including the connector and the conductive pattern;
   a processor for controlling the components of the mobile computing device; and
   a memory storing instructions including an operating system (OS) and application programs, which when executed by the processor, cause the mobile computing device to:
   supply, via control of the power management module, first power from the battery to the conductive pattern to wirelessly transmit to a first external device,
   supply, via control of the power management module, second power from the battery to the connector to wiredly transmit to a second external device supporting an on-the-go (OTG) function, and
   while the second external device is connected to at least one pin for an OTG connection of the connector, operate an application to communicate with the communication module using data received from the second external device through the connector while transmitting the first and second power from the battery,
   wherein the power management module is configured to:
   change a first voltage generated by the battery into a second voltage higher than the first voltage,
   supply a first current generated by the second voltage to the conductive pattern, and
   supply a second current generated by the second voltage to the connector.

2. The mobile computing device of claim 1, wherein the first current and the second current are the same.

3. The mobile computing device of claim 1,
   wherein the connector further comprises a quick charging interface configured to charge another battery included in at least one of the first and the second external devices to a voltage level selected from a plurality of voltage levels,
   wherein the quick charging interface is electrically connected with the connector and/or the conductive pattern, and
   wherein the quick charging interface supports an increased transmitting or receiving power.

4. The mobile computing device of claim 3, wherein the power management module is further configured to:
   receive information on charging from the at least one of the first and second external devices; and
   select the selected voltage level from the plurality of voltage levels based on the received information.

5. The mobile computing device of claim 1, further comprising:
   a power supply system of the mobile computing device electrically connected with the connector,
   wherein the power management module is further configured to:
   provide power to the power supply system while transmitting the first and second power from the battery.

6. The mobile computing device of claim 1, further comprising:
   wherein the processor further configured to control the display to display information related to the second external device based at least in part on the data received from the second external device through the connector.

7. The mobile computing device of claim 1,
   wherein the power management module comprises:
   a first control circuit for controlling a current flow with the second external device connected through the connector;
   a second control circuit for controlling a current flow with the conductive pattern; and
   a third control circuit electrically connected with the first control circuit, the second control circuit, and the battery, and
   wherein the third control circuit is configured to:
   change a voltage and a current from the battery, and
   provide the voltage and the current to the first control circuit or the second control circuit.

8. The mobile computing device of claim 7, wherein at least one of the first control circuit or the second control circuit includes at least one switching element electrically connected between the connector or the third control circuit and the conductive pattern.

9. The mobile computing device of claim 8, wherein the at least one switching element includes at least two transistor elements connected in series between the connector or the third control circuit and the conductive pattern.

10. The mobile computing device of claim 7, wherein the third control circuit includes a buck/boost converter and a logic circuit controlling the buck/boost converter.

11. The mobile computing device of claim 10,
    wherein the third control circuit further includes a charging switching circuit electrically connected between the buck/boost converter and the battery, and
    wherein the logic circuit controls the charging switching circuit to prevent over-charging or over-discharging of the battery.

12. A method of operating a mobile computing device, the method comprising:
    identifying whether the mobile computing device is connected with a first external device and a second external device;
    supplying, by using a power management module of the mobile computing device, first power from a battery of the mobile computing device to a conductive pattern of the mobile computing device to wirelessly transmit to a first external device;
    supplying, by using the power management module, second power from the battery to a connector of the mobile computing device to wiredly transmit to a second external device supporting an on-the-go (OTG) function; and
    while the second external device is connected to at least one pin for an OTG connection of the connector, operating an application to communicate with a communication module of the mobile computing device using data received from the second external device through the connector while transmitting the first and second power from the battery, wherein the power management module is configured to:

change a first voltage generated by the battery into a second voltage higher than the first voltage, supply a first current generated by the second voltage to the conductive pattern, and supply a second current generated by the second voltage to the connector.

13. The method of claim 12, further comprising:

supplying, by using the power management module, power to a power supply system of the mobile computing device while transmitting the first and second power from the battery.

14. A non-transitory machine-readable storage device storing instructions that, when executed by one or more processors, cause the one or more processors to perform operations comprising:

identifying whether a mobile computing device is connected with a first external device and a second external device;

supplying, by using a power management module of the mobile computing device, first power from a battery of the mobile computing device to a conductive pattern of the mobile computing device to wirelessly transmit to a first external device;

supplying, by using the power management module, second power from the battery to a connector of the mobile computing device to wiredly transmit to a second external device supporting an on-the-go (OTG) function; and while the second external device is connected to at least one pin for an OTG connection of the connector, operating an application to communicate with a communication module of the mobile computing device using data received from the second external device through the connector while transmitting the first and second power from the battery, wherein the power management module is configured to:

change a first voltage generated by the battery into a second voltage higher than the first voltage, supply a first current generated by the second voltage to the conductive pattern, and supply a second current generated by the second voltage to the connector.

* * * * *